US012520324B2

(12) United States Patent
Yuan et al.

(10) Patent No.: US 12,520,324 B2
(45) Date of Patent: Jan. 6, 2026

(54) TWO-STAGE DOWNLINK CONTROL INFORMATION FOR SCHEDULING USER EQUIPMENTS

(71) Applicant: QUALCOMM Incorporated, San Diego, CA (US)

(72) Inventors: Fang Yuan, Beijing (CN); Aleksandar Damnjanovic, Del Mar, CA (US); Mostafa Khoshnevisan, San Diego, CA (US); Yitao Chen, San Diego, CA (US); Wooseok Nam, San Diego, CA (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 18/000,810

(22) PCT Filed: Jul. 29, 2020

(86) PCT No.: PCT/CN2020/105485
§ 371 (c)(1),
(2) Date: Dec. 5, 2022

(87) PCT Pub. No.: WO2022/021137
PCT Pub. Date: Feb. 3, 2022

(65) Prior Publication Data
US 2023/0232407 A1    Jul. 20, 2023

(51) Int. Cl.
*H04W 72/23* (2023.01)
*H04L 1/00* (2006.01)
*H04W 72/02* (2009.01)

(52) U.S. Cl.
CPC ........... *H04W 72/23* (2023.01); *H04L 1/0038* (2013.01); *H04W 72/02* (2013.01)

(58) Field of Classification Search
CPC ...... H04W 72/23; H04W 72/02; H04L 1/0038
See application file for complete search history.

(56) References Cited

U.S. PATENT DOCUMENTS

| 2016/0227541 A1 | 8/2016 | Damnjanovic et al. |
| 2018/0092070 A1* | 3/2018 | Liao ...................... H04L 1/0028 |

(Continued)

FOREIGN PATENT DOCUMENTS

| CN | 103427970 A | 12/2013 |
| CN | 103458509 A | 12/2013 |

(Continued)

OTHER PUBLICATIONS

International Search Report and Written Opinion—PCT/CN2020/105485—ISA/EPO—Apr. 29, 2021.

(Continued)

*Primary Examiner* — Won Tae C Kim
(74) *Attorney, Agent, or Firm* — Kevin M. Donnelly; Holland & Hart LLP

(57) ABSTRACT

This disclosure provides methods, devices, and systems for resource selection supporting the identification of resources for receiving two-stage downlink control information (DCI). In some systems, for example, a base station may transmit a first stage DCI and a second stage DCI to a user equipment. The first stage DCI may include control information for a group of UEs including the UE and the second stage DCI may include control information that is specific to the UE. The UE may determine a resource to use for receiving the second stage DCI based on an indication in the first stage DCI. In some examples, the UE may determine a resource from a resource pool based on a resource selector included in the first stage DCI and receive the second stage DCI over the determined resource. The resource pool may be indicated by the first stage DCI or pre-configured at the UE.

35 Claims, 22 Drawing Sheets

(56) References Cited

U.S. PATENT DOCUMENTS

2018/0124753 A1    5/2018  Sun et al.
2019/0349897 A1   11/2019  Hosseini et al.
2020/0100219 A1*  3/2020  Takeda .................. H04W 72/23

FOREIGN PATENT DOCUMENTS

CN         109088707 A    12/2018
WO    WO-2018085429     5/2018
WO    WO-2019160713 A1  8/2019

OTHER PUBLICATIONS

Supplementary European Search Report—EP20947087—Search Authority—The Hague—Mar. 21, 2024.

\* cited by examiner

TWO-STAGE DOWNLINK CONTROL INFORMATION FOR SCHEDULING USER EQUIPMENTS

CROSS REFERENCE

The present Application is a 371 national stage filing of International PCT Application No. PCT/CN2020/105485 by YUAN et al. entitled "TWO-STAGE DOWNLINK CONTROL INFORMATION FOR SCHEDULING USER EQUIPMENTS," filed Jul. 29, 2020, which is assigned to the assignee hereof, and which is expressly incorporated by reference in its entirety herein.

TECHNICAL FIELD

The following relates generally to wireless communication, and more specifically, to the use of a two-stage downlink control information (DCI) scheme for scheduling resources for multiple user equipments (UEs).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may communicate with multiple UEs that act or otherwise function as a set of distributed panels. The multiple UEs may regularly communicate with each other or may cooperatively function together (for example, as a unit) and may function as a set of distributed panels based on such regular communication or cooperative function. In some examples, the multiple UEs may function cooperatively based on performing similar or complimentary functions. The multiple UEs, based on functioning cooperatively, may receive at least some of the same control information. For example, the multiple UEs may use or otherwise benefit from at least some of the same control information. The base station may redundantly transmit some control information to each UE individually in cases in which the base station transmits control information to each of the multiple UEs separately, which may reduce the spectral efficiency, or the achievable throughput, or both of the wireless communications systems.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method includes receiving, from a base station, first downlink control information (DCI) over a first resource, the first DCI including an indication and first control information common to a group of UEs including the UE, determining a second resource for second DCI based on the indication in the first DCI, and receiving, from the base station, the second DCI over the second resource, the second DCI including second control information specific to the UE.

Another innovative aspect of the subject matter described in this disclosure can be implemented in an apparatus for wireless communications at a UE. The apparatus includes a processor, memory coupled with the processor, and instructions stored in the memory. The instructions may be executable by the processor to cause the apparatus to receive, from a base station, first DCI over a first resource, the first DCI including an indication and first control information common to a group of UEs including the UE, determine a second resource for second DCI based on the indication in the first DCI, and receive, from the base station, the second DCI over the second resource, the second DCI including second control information specific to the UE.

Another innovative aspect of the subject matter described in this disclosure can be implemented in another apparatus for wireless communications at a UE. The apparatus includes means for receiving, from a base station, first DCI over a first resource, the first DCI including an indication and first control information common to a group of UEs including the UE, determining a second resource for second DCI based on the indication in the first DCI, and receiving, from the base station, the second DCI over the second resource, the second DCI including second control information specific to the UE.

Another innovative aspect of the subject matter described in this disclosure can be implemented in a non-transitory computer-readable medium storing code for wireless communications at a UE. The code includes instructions executable by a processor to receive, from a base station, first DCI over a first resource, the first DCI including an indication and first control information common to a group of UEs including the UE, determine a second resource for second DCI based on the indication in the first DCI, and receive, from the base station, the second DCI over the second resource, the second DCI including second control information specific to the UE.

In some implementations, the method, apparatuses, and non-transitory computer-readable medium may be configured to monitor a search space set of a control resource set (CORESET) for the first DCI, the search space set including the first resource, and blind decode at least the first resource. In some examples, receiving the first DCI may be based on the blind decoding.

In some implementations, the method, apparatuses, and non-transitory computer-readable medium may be configured to monitor a search space set of a CORESET for the second DCI based on determining the second resource, the search space set including the second resource. In some examples, receiving the second DCI may be based on the monitoring.

In some implementations of the method, apparatuses, and non-transitory computer-readable medium, receiving the second DCI over the second resource includes receiving the second DCI over a physical downlink shared channel (PDSCH) based on determining the second resource, the PDSCH including the second resource.

In some implementations, the method, apparatuses, and non-transitory computer-readable medium may be configured to receive, from the base station, an indication of a configuration, the configuration indicating that a block of DCI of the first DCI may be associated with the UE, and decode the block of DCI of the first DCI.

In some implementations of the method, apparatuses, and non-transitory computer-readable medium, determining the second resource for the second DCI includes determining the second resource for the second DCI from a resource pool based on the indication in the first DCI.

In some implementations, the method, apparatuses, and non-transitory computer-readable medium may be configured to determine the resource pool based on the indication in the first DCI and determine a value of a resource selector associated with the UE, the resource selector included in the first DCI. In some examples, determining the second resource from the resource pool may be based on the value of the resource selector.

In some implementations, the method, apparatuses, and non-transitory computer-readable medium may be configured to determine the resource pool based on a resource pool configuration and determine a value of a resource selector associated with the UE. In some examples, the indication in the first DCI may include the resource selector and determining the second resource from the resource pool may be based on the value of the resource selector.

One innovative aspect of the subject matter described in this disclosure can be implemented in a method for wireless communications at a base station. The method includes determining a first resource for transmitting first DCI to a group of UEs including a UE and a second resource for transmitting second DCI to the UE, transmitting, to the group of UEs, the first DCI over the first resource, the first DCI including an indication of the second resource for the second DCI and first control information common to the group of UEs, and transmitting, to the UE, the second DCI over the second resource, the second DCI including control information specific to the UE.

Another innovative aspect of the subject matter described in this disclosure can be implemented in an apparatus for wireless communications at a base station. The apparatus includes a processor, memory coupled with the processor, and instructions stored in the memory. The instructions may be executable by the processor to cause the apparatus to determine a first resource for transmitting first DCI to a group of UEs including a UE and a second resource for transmitting second DCI to the UE, transmit, to the group of UEs, the first DCI over the first resource, the first DCI including an indication of the second resource for the second DCI and first control information common to the group of UEs, and transmit, to the UE, the second DCI over the second resource, the second DCI including control information specific to the UE.

Another innovative aspect of the subject matter described in this disclosure can be implemented in another apparatus for wireless communications at a base station. The apparatus includes means for determining a first resource for transmitting first DCI to a group of UEs including a UE and a second resource for transmitting second DCI to the UE, transmitting, to the group of UEs, the first DCI over the first resource, the first DCI including an indication of the second resource for the second DCI and first control information common to the group of UEs, and transmitting, to the UE, the second DCI over the second resource, the second DCI including control information specific to the UE.

Another innovative aspect of the subject matter described in this disclosure can be implemented in a non-transitory computer-readable medium storing code for wireless communications at a base station. The code includes instructions executable by a processor to determine a first resource for transmitting first DCI to a group of UEs including a UE and a second resource for transmitting second DCI to the UE, transmit, to the group of UEs, the first DCI over the first resource, the first DCI including an indication of the second resource for the second DCI and first control information common to the group of UEs, and transmit, to the UE, the second DCI over the second resource, the second DCI including control information specific to the UE.

In some implementations of the method, apparatuses, and non-transitory computer-readable medium, transmitting the first DCI over the first resource includes transmitting the first DCI over a search space set of a CORESET based on determining the first resource, the search space set including the first resource.

In some implementations of the method, apparatuses, and non-transitory computer-readable medium, transmitting the second DCI over the second resource includes transmitting the second DCI over a search space set of a CORESET based on determining the second resource, the search space set including the second resource.

In some implementations of the method, apparatuses, and non-transitory computer-readable medium, transmitting the second DCI over the second resource includes transmitting the second DCI over a PDSCH based on determining the second resource, the PDSCH including the second resource.

In some implementations of the method, apparatuses, and non-transitory computer-readable medium, the first DCI may include a second indication of a third resource for third downlink control information for a second UE. In some implementations, the method, apparatuses, and non-transitory computer-readable medium may be configured to transmit, to the second UE, the third DCI over the third resource, the third DCI including second control information specific to the second UE.

In some implementations, the method, apparatuses, and non-transitory computer-readable medium may be configured to scramble the first DCI based on a radio network temporary identifier (RNTI) that may be common to the group of UEs.

In some implementations, the method, apparatuses, and non-transitory computer-readable medium may be configured to scramble the second DCI based on an RNTI that may be specific to the UE.

In some implementations, the method, apparatuses, and non-transitory computer-readable medium may be configured to transmit, to the UE, an indication of a configuration, the configuration indicating that a block of DCI of the first DCI may be associated with the UE.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

Like reference numbers and designations in the various drawings indicate like elements.

DETAILED DESCRIPTION

Figure 1:
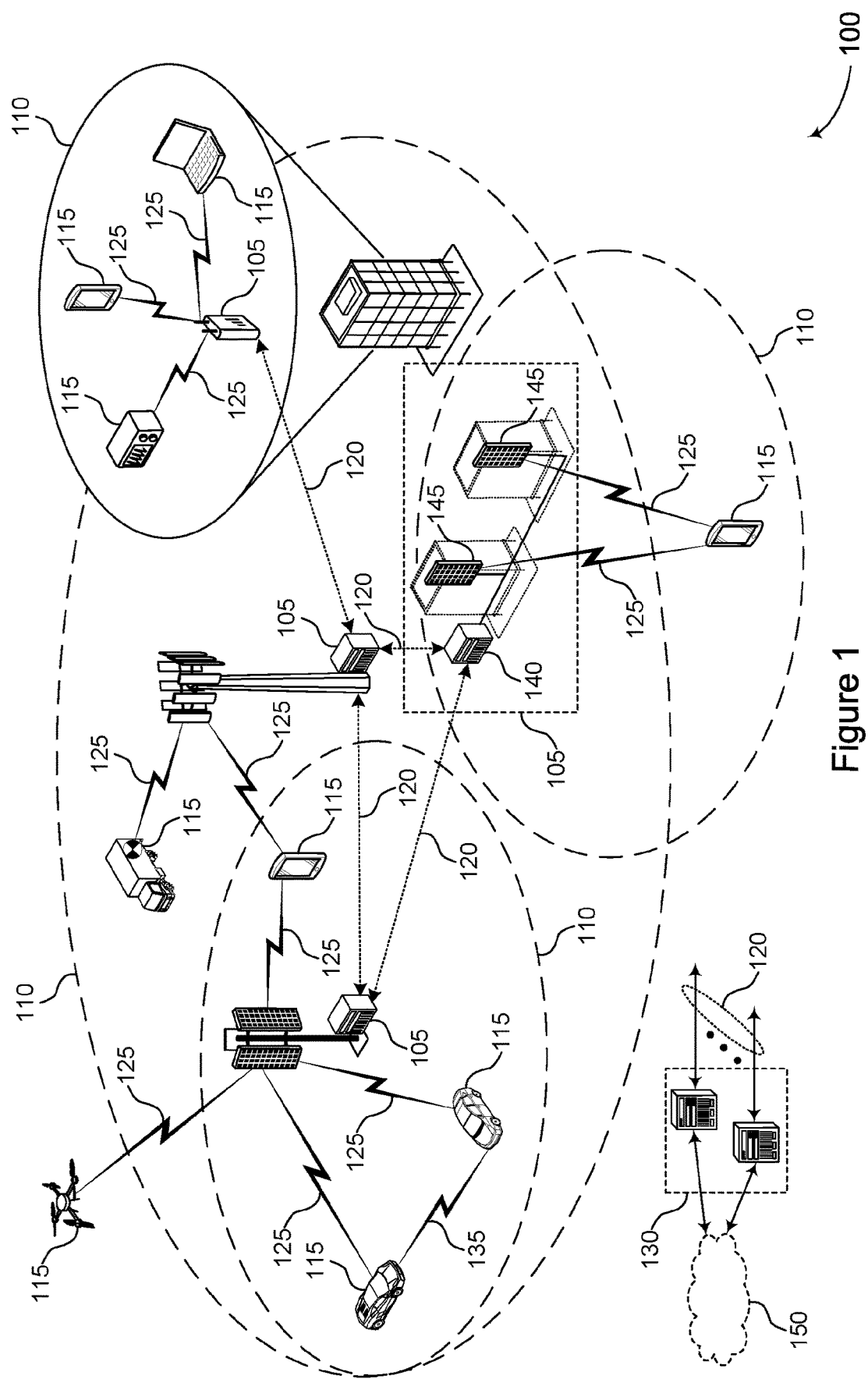
FIGS. 1 and 2 illustrate examples of wireless communications systems that support two-stage downlink control information (DCI) for scheduling user equipments (UEs) in accordance with aspects of the present disclosure.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

In some wireless communications systems, a base station may communicate with multiple UEs that act or otherwise function as a set of distributed panels. The multiple UEs may regularly communicate with each other or may cooperatively function together (for example, as a unit) and may function as a set of distributed panels based on such regular communication or cooperative function. In some examples, the multiple UEs may function cooperatively based on performing similar or complimentary functions. The multiple UEs, based on functioning cooperatively, may receive at least some of the same control information. For example, the multiple UEs may use or otherwise benefit from at least some of the same control information. The base station may redundantly transmit some control information to each UE individually in cases in which the base station transmits control information to each of the multiple UEs separately, which may reduce the spectral efficiency, or the achievable throughput, or both of the wireless communications systems.

Various aspects generally relate to a two-stage downlink control information (DCI) scheme for use in scheduling resources for multiple user equipments (UEs). Some aspects more specifically relate to the use of a two-stage DCI scheme to schedule resources for multiple UEs that operate cooperatively, for example, as a set of distributed panels. In some aspects, a UE may receive first stage DCI and then determine a resource for receiving second stage DCI based on an indication in the first stage DCI. In such aspects, the first stage DCI may carry common control information ("UE group-common control information") for the multiple UEs as well as an indication, for each of the multiple UEs, of a resource that carries the second stage DCI, including UE-specific control information, for the respective UE.

In some aspects, a base station may scramble the first stage DCI using a UE group-common identifier before transmitting (such as broadcasting) the first stage DCI over a search space set of a control resource set (CORESET). The base station may additionally scramble the second stage DCI for each of the UEs using respective UE-specific identifiers before transmitting the second stage DCI over a search space set of a CORESET (which may be a different search space set than the search space set used to carry the first stage DCI) or over a physical downlink shared channel (PDSCH). In some examples, the base station may transmit a configuration via radio resource control (RRC) signaling to each of the UEs that associates a block of DCI fields of the first stage DCI to each of the UEs. Each of the UEs may then determine the resource to use for receiving the respective second stage DCI based on an indication included in the block of DCI fields associated with the respective UE. In some examples, the block of DCI fields associated with each of the UEs may indicate a resource pool from which the respective UE may determine a resource to use for receiving the respective second stage DCI. In such examples, the block of DCI fields may also include a resource selector that the UEs may use to determine the resource to use for receiving the respective second stage DCI from the indicated resource pool. In some other examples, each of the UEs may be pre-configured with a resource pool (based on a previously-received resource pool configuration) and the block of DCI fields associated with each of the UEs may include the resource selector that the respective UE may use to determine the resource over which it may receive the respective second stage DCI from the pre-configured resource pool.

Particular implementations of the subject matter described in this disclosure can be implemented to realize one or more of the following potential advantages. In some implementations, the described techniques can be used to achieve greater spectral efficiency. For example, a group of UEs may receive at least some of the same control information and, accordingly, the base station may broadcast the first stage DCI such that at least some if not all UEs of the group of UEs may receive control information that is common to the group of UEs. As such, the base station may avoid some redundancy if transmitting common or shared control information to each UE of the group of UEs. Moreover, based on including, for each of the group of UEs, a respective indication of a respective resource that the UE may use to receive UE-specific control information in the second stage DCI, the base station may also provide each UE of the group of UEs with UE-specific control information while maintaining low overhead and enabling each UE of the group UEs to avoid blind decoding over a search space set of a CORESET to receive the second stage DCI. In examples in which each UE of the group of UEs avoids blind decoding for UE-specific control information, each UE of the group of UEs may experience reduced power consumption or increased processing capability based on avoiding blind decoding.

FIG. 1 illustrates an example of a wireless communications system 100 that supports two-stage DCI for scheduling UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to determine (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for determining a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback such that the device may provide HARQ feedback in a specific slot for data received in a previous symbol in the slot. In other examples, the device may provide HARQ feedback in a subsequent slot, or according to some other time interval.

In some cases, a group of UEs 115 may regularly communicate with each other and function cooperatively (for example, as a unit). In such cases, each UE 115 of the group of UEs 115 may act or otherwise function as a distributed panel of a set of distributed panels and may receive at least some of the same control information as the other UEs 115 in the group of UEs 115. To avoid potential redundancy associated with transmitting separate (or individual) DCI to each UE 115 of the group of UEs 115, which may arise because at least some of the control information in each separate DCI may be the same, a base station 105 may broadcast or otherwise transmit DCI that includes the control information that is shared or common to at least some if not each UE 115 of the group of UEs 115 such that each UE 115 is able to receive and decode the DCI. Such DCI may be referred to herein as group-common DCI. In some cases, however, each UE 115 of the group of UEs 115 may also monitor and perform blind decoding on a downlink control channel for UE-specific DCI. Such blind decoding may inefficiently consume a processing capability and a power of a UE 115.

In some implementations of the present disclosure, the base station 105 may include, for each UE 115 of the group of UEs 115, an indication in the group-common DCI that a respective UE 115 of the group of UEs 115 may use to determine a resource for receiving UE-specific DCI. As such, for each UE 115, the group-common DCI may function as a first stage DCI and the UE-specific DCI may function as a second stage DCI because the two DCIs are linked via the indications included in the group-common DCI. Accordingly, the group-common DCI may be equivalently referred to as the first stage DCI or first DCI and the UE-specific DCI may be equivalently referred to as the second stage DCI or second DCI. The base station 105 may broadcast the first stage DCI to the group of UEs 115 over a search space set of CORESET and may transmit the second stage DCI to each UE 115 of the group of UEs 115 separately over either a search space set of a CORESET or a PDSCH resource.

In some examples, the first stage DCI may include an indication of a common resource pool for the group of UEs 105 and, for each UE 115 of the group of UEs 115, a resource selector. In such examples, a UE 115 of the group of UEs 115 may determine a resource to use for receiving second stage DCI that is associated with (specific to) the UE 115 from the common resource pool based on a resource selector that is associated with the UE 115. In some other examples, the base station 105 may configure (pre-configure) each UE 115 of the group of UEs 115 with a resource pool and the first stage DCI may include, for each UE 115 of the group of UEs 115, a resource selector. In such examples, a UE 115 of the group of UEs 115 may determine a resource to use for receiving second stage DCI that is associated with (specific to) the UE 115 from a resource pool configured at the UE 115 based on a resource selector that is associated with the UE 115.

Upon receiving the first stage DCI including the group-common control information and the second stage DCI including the UE-specific control information, each UE 115 of the group of UEs 115 may determine a resource allocation for communicating with the base station 105. Accordingly, the base station 105 may communicate, either via uplink or a downlink, with each UE 115 of the group over the determined resource allocations.

Figure 2:
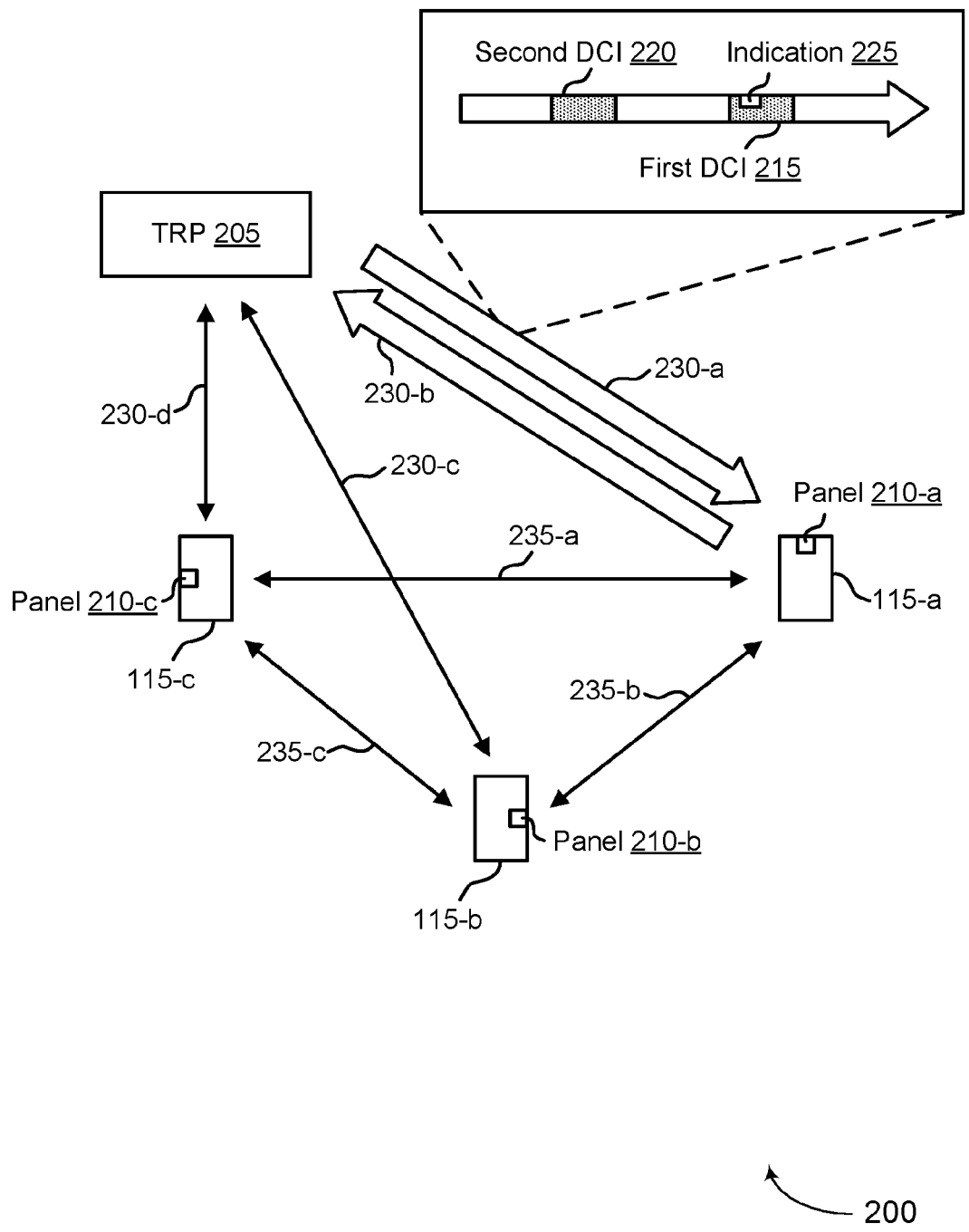

FIG. 2 illustrates an example of a wireless communications system 200 that supports two-stage DCI for scheduling UEs in accordance with aspects of the present disclosure. In some examples, the wireless communications system 200 may implement aspects of the wireless communications system 100. The wireless communications system 200 may include a TRP 205 and a group of UEs 115, including a UE 115-a, a UE 115-b, and a UE 115-c. The TRP 205 and the group of UEs 115 may be examples of corresponding devices as described with reference to FIG. 1. For example, the TRP 205 may be an example of a base station 105 or a subcomponent of a base station 105 as described with reference to FIG. 1. In some examples, the TRP 205 may broadcast first DCI 215 including, for each UE 115 of the group of UEs 115, an indication 225 to the group of UEs 115 and each UE 115 of the group of UEs 115 may determine a resource to use for receiving respective second DCI 220 from the TRP 205 based on an associated indication 225 included in the first DCI 215.

In some examples, the group of UEs 115 may function or otherwise act as a set of distributed panels 210 and each UE 115 of the group of UEs 115 may communicate with the TRP 205 as a distributed panel 210 of the set of distributed panels 210. For example, the UE 115-a may communicate with the TRP 205 via a panel 210 210-a, the UE 115-b may communicate with the TRP 205 via a panel 210-b, and the UE 115-c may communicate with the TRP 205 via a panel 210-c, all of which may be used by the UEs 115 as distributed panels 210 of the set of distributed panels 210. Each of the UEs 115 may communicate with the TRP 205 via a panel 210 using a communication link 230. For example, the UE 115-a may communicate with the TRP 205 using a communication link 230-a (a downlink communication link) and a communication link 230-b (an uplink communication link), the UE 115-b may communicate with the TRP 205 using a communication link 230-c, and the UE 115-c may communicate with the TRP 205 using a communication link 230-d. As illustrated in the wireless communications system 200, the communication links 230 may support both uplink and downlink communications. In some aspects, the communication links 230 may be examples of Uu links or a Uu interface between the TRP 205 and the UEs 115.

Additionally, the UEs 115 may communicate with each other via sidelinks 235. For example, the UE 115-a and the UE 115-b may communicate using a sidelink 235-b, the UE 115-b and the UE 115-c may communicate using a sidelink 235-c, and the UE 115-c and the UE 115-a may communicate using a sidelink 235-a. In some examples, the UEs 115 may use sidelink communications to facilitate cooperative operation or functionality between the UEs 115. For example, the UEs 115 may be examples of wireless devices that are capable of cooperation or collaboration and, as such, may operate or function together (may perform similar or complimentary operations as a collective). For instance, the group of UEs 115 may function as a disaggregated UE, which may be different than a single UE 115 including co-located panels 210. The group of UEs 115 may be an example of a group of unmanned aerial vehicles (UAVs) (for example, drones), industrial devices, or any other devices that make operational decisions (such as driving, movement, or placement decisions) based on communication with other peer devices. In some aspects, the UEs 115 may function as the set of distributed panels 210 based on being capable of cooperative or collaborative functionalities. In other words, the basis on which the group of UEs 115 may function as a set of distributed panels may be related to the capability of the group of UEs 115 to cooperate or collaborate on operational decisions. In the group of UEs 115, a UE identity (ID) or identifier can be an explicit ID such as a radio network temporary identifier (RNTI) or an implicit ID that is associated with a channel ID or a reference signal ID. For example, any of a beam ID, a transmission configuration indicator (TCI) state ID, a spatial relationship information ID, a sounding reference signal (SRS) resource ID, or an SRS resource set ID may be used to identify a UE 115 within the group of UEs 115.

In cases in which the UEs 115 communicate with each other and the TRP 205 as a set of distributed panels 210, each of the UEs 115 may receive at least some of the same control information from the TRP 205. For example, the TRP 205 may schedule each of the UEs 115 with a resource allocation to use for communication with TRP 205 that is at least partially consistent across the UEs 115. For instance, the TRP 205 may determine, for each of the UEs 115, a resource allocation to use for communication between the TRP 205 and the UEs 115 and the resource allocation for each of the UEs 115 may share some characteristics or parameters, such as a frequency resource allocation, a time resource allocation, or any other characteristic or parameter that the UEs 115 may use for communication with the TRP 205. In a set of distributed panels 210, a panel ID can be an explicit panel ID or an implicit panel ID that is associated with a channel ID or a reference signal ID. For example, any of a beam ID, a close loop index in power control configuration, a TCI state ID, a spatial relationship information ID, an SRS resource ID, or an SRS resource set ID may be used to identify a panel 210.

As such, in some examples, the TRP may broadcast a group-common DCI to the UEs 115 to avoid redundantly transmitting control information that is common to the group of UEs 115 to each UE 115 of the group of UEs 115 separately. The TRP 205 may include such group-common control information (such as group-common DCI indications) in the first DCI 215 and may broadcast the first DCI 215 to the UEs 115. Each UE 115 of the group of UEs 115 may receive the first DCI 215 including the group-common control information based on monitoring a physical downlink control channel (PDCCH). For example, the TRP 205 may transmit the first DCI 215 over a search space set of a CORESET and the UEs 115 may monitor the search space set of the CORESET to receive the first DCI 215. In some examples, the UEs 115 may perform blind decoding over the monitored resources to receive and decode the first DCI 215.

The TRP 205 may additionally transmit UE-specific control information to at least some if not each of the UEs 115 (because the TRP 205 may refrain from including UE-specific control information in addition to the group-common control information in the first DCI 215). In some examples, the TRP 205 may transmit the UE-specific control information to each of the UEs 115 of the group of UEs 115 separately in the second DCI 220 over a different search space set of a CORESET (which may be the same CORESET over which the TRP 205 transmits the first DCI 215 or a different CORESET over which the TRP 205 transmits the first DCI 215). Each of the UEs 115 may monitor the search space set of the CORESET and may perform blind decoding over the monitored resources to receive and decode second DCI 220 that is associated with the UE 115. Such blind decoding by a UE 115 for multiple DCI transmissions from the TRP 205, however, may inefficiently consume one or both of the battery power or processing capability of the UE 115.

In some implementations of the present disclosure, the TRP 205 may include an indication 225 in the first DCI 215 that a UE 115 of the group of UEs 115 may use to determine, for example, a resource for receiving the second DCI 220 including control information that is specific to the UE 115. For example, the first DCI 215 may include, for each UE 115 of the group of UEs 115, an indication 225 that a UE 115 may use to determine a resource carrying the second DCI 220 that is specific to that respective UE 115. For instance, although the first DCI 215 is shown to include a single indication 225, the first DCI 215 may include an indication 225 that the UE 115-*a* may use to determine a resource for receiving second DCI 220 that is specific to the UE 115-*a*, an indication 225 that the UE 115-*b* may use for use to determine a resource for receiving second DCI 220 that is specific to the UE 115-*b*, and an indication 225 that the UE 115-*c* may use to determine a resource for receiving second DCI 220 that is specific to the UE 115-*c*. Likewise, although shown as being transmitted from the TRP 205 to the UE 115-*a*, the TRP 205 may similarly transmit respective second DCI 220 to the UE 115-*b* and the UE 115-*c*. Additional details relating to how each UE 115 of the group of UEs 115 determine which indication 225 to use are described herein, including with reference to FIGS. 4 and 5. Such second DCI 220 that is specific to a UE 115 may include DCI that includes control information that is specific to a UE 115 or DCI that the TRP 205 may otherwise transmit separately to each UE 115 (for example, via a unicast transmission), such as control information relating to a demodulation reference signal (DMRS) configuration.

Accordingly, the TRP 205 may transmit the second DCI 220 separately to each UE 115 over an indicated search space set of a CORESET or over an indicated physical downlink shared channel (PDSCH) resource. As such, in some examples, a UE 115 may determine a search space set of a CORESET over which the TRP 205 may transmit the second DCI 220 to the UE 115 based on the indication 225 in the first DCI 215. In such examples, the resource determined by the UE 115 to carry the second DCI 220 may be the search space set of the CORESET or may be included within the search space set of the CORESET. In some other examples, the UE 115 may determine a resource of a PDSCH over which the TRP 205 may transmit the second DCI 220 to the UE 115 based on the indication 225 in the first DCI 215. In such examples, the UE 115 may receive the second DCI 220 over the PDSCH resource that the UE 115 determined to carry the second DCI 220. Additional details relating to the resource over which a UE 115 of the group of UEs 115 may receive an associated second DCI 220 are described herein, including with reference to FIG. 3.

In some implementations, the TRP 205 may scramble the first DCI 215 and the second DCI 220 such that associated UEs 115 (UEs 115 for which the control information is assigned or addressed to) are able to decode the DCI and unassociated UEs 115 are unable to decode the DCI. In some examples, for instance, the TRP 205 may scramble the first DCI 215 including the control information that is common to the group of UEs 115 based on an identifier that is common to the group of UEs 115. For example, the TRP 205 may scramble the first DCI 215 based on a UE group-common RNTI, such as an RNTI that is common to the group of UEs 115 including the UE 115-*a*, the UE 115-*b*, and the UE 115-*c*. Each UE 115 of the group of UEs 115 may decode the scrambled first DCI 215 based on the UE group-common RNTI.

Additionally or alternatively, the TRP 205 may scramble each second DCI 220 based on an identifier that is specific or unique to an associated UE 115 (for example, a UE 115 for which the second DCI 220 includes UE-specific control information). For example, the TRP 205 may scramble a second DCI 220 for the UE 115-*a* based on an RNTI that is specific to the UE 115-*a*, a second DCI 220 for the UE 115-*b* based on an RNTI that is specific to the UE 115-*b*, and a second DCI 220 for the UE 115-*c* based on an RNTI that is specific to the UE 115-*c*. Likewise, each of the UE 115-*a*, the UE 115-*b*, and the UE 115-*c* may decode their associated second DCI 220 based on their UE-specific RNTI.

Figure 3:
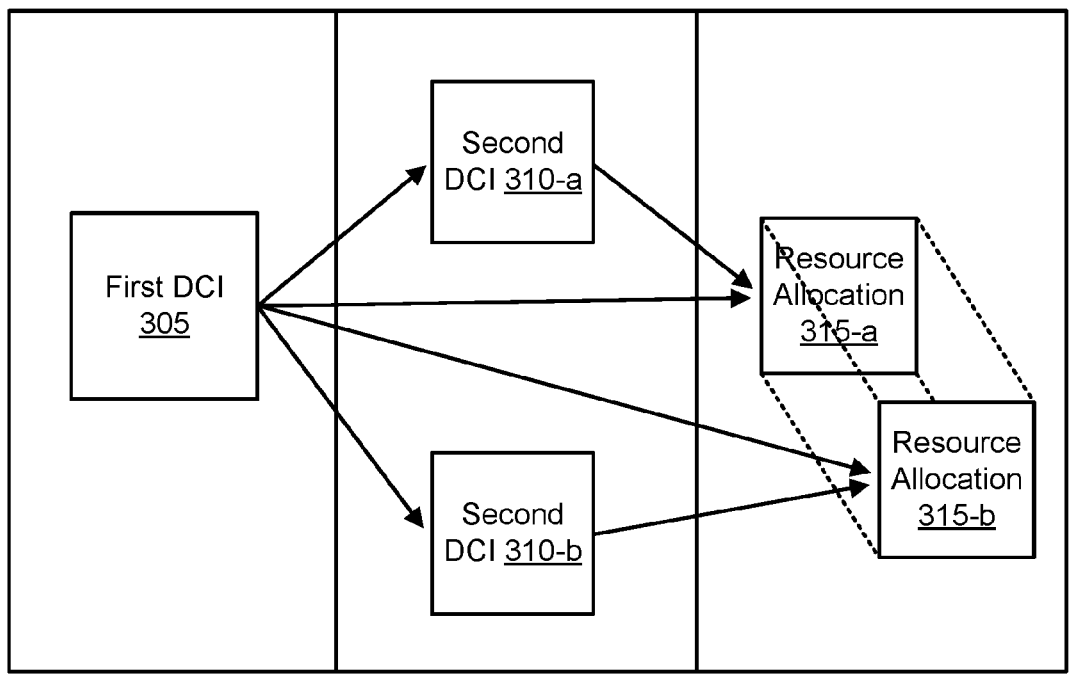
FIG. 3 illustrates an example of a communications timeline that supports two-stage DCI for scheduling UEs in accordance with aspects of the present disclosure.

FIG. 3 illustrates an example of a communications timeline 300 that supports two-stage DCI for scheduling UEs in accordance with aspects of the present disclosure. In some examples, the communications timeline 300 may be implemented by or may implement aspects of the wireless communications system 100 and the wireless communications system 200. The communications timeline 300 illustrates communication between a base station 105, which may function as a TRP, and a group of UEs 115, including a first UE 115 and a second UE 115, which may be examples of corresponding devices described herein.

In some examples, the base station 105 may transmit (for example, broadcast) first DCI 305 to the first UE 115 and the second UE 115 in which the first DCI 305 may include control information that is common to both the first UE 115 and the second UE 115 over a first resource. The first DCI 305 may additionally include indications that the first UE 115 and the second UE 115 may use to determine respective resources for receiving second DCI 310 that includes UE-specific control information. For example, the first DCI 305 may include a first indication that the first UE 115 may use to determine a second resource to use for receiving second DCI 310-*a* and a second indication that the second UE 115 may use to determine a third resource to use for receiving second DCI 310-*b*. The base station 105 may transmit the first DCI 305 over a search space set on a CORESET of a PDCCH (the search space set on the CORESET may include the first resource) and may transmit the second DCI 310-*a* and the second DCI 310-*a* over another search space set on another CORESET of the PDCCH or over a PDSCH resource as indicated by the first DCI 305. Both the first UE 115 and the second UE 115 may receive the first DCI 305 over the search space set on the CORESET, the first UE 115 may receive the second DCI 310-*a* over an indicated second resource (either in a search space set on a CORESET or over a PDSCH), and the second UE 115 may receive the second DCI 310-*b* over an indicated third resource (either in a search space set on a CORESET or over a PDSCH).

In examples in which the second resource over which the base station 105 may transmit the second DCI 310-*a* and the third resource over which the base station 105 may transmit the second DCI 310-*b* are resources included in search space sets of a CORESET, the search space sets over which the base station 105 may transmit one or both of the second DCI 310-*a* or the second DCI 310-*b* may be different than the search space set over which the base station 105 may transmit the first DCI 305. The CORESET on which the search space set including the second resource or the third resource is allocated may be the same as the CORESET over which the base station 105 transmits the first DCI 305 or different than the CORESET over which the base station 105 transmits the first DCI 305. In examples in which the second resource over which the base station 105 may transmit the second DCI 310-*a* and the third resource over which the base station 105 may transmit the second DCI 310-*b* are resources included in a PDSCH, the base station 105 may transmit the second DCI 310-*a* and the second DCI 310-*b* over the same PDSCH or different PDSCHs. In such examples, the first indication included in the first DCI 305 indicating the second resource and the second indication in the first DCI 305 indicating the third resource may indicate a resource selection from a PDSCH, as described in more detail herein, including with reference to FIGS. 4 and 5.

Based on receiving the first DCI 305 and the second DCI 310-*a*, the first UE 115 may determine a resource allocation 315-*a* to use for communication with the base station 105. Similarly, upon receiving the first DCI 305 and the second DCI 310-*b*, the second UE 115 may determine a resource allocation 315-*b* to use for communication with the base station 105. The resource allocations 315 may be examples of PDSCHs or physical uplink shared channels (PUSCHs). Alternatively, the UEs 115 may use the resource allocations 315 for sidelink communications with other UEs 115 and, as such, the resource allocations 315 may be examples of physical sidelink shared channels (PSSCHs). In some examples, the resource allocations 315 may share some characteristics, such as a time resource or a frequency resource, while other characteristics of the resource allocations 315 or the communications between the base station 105 and the UEs 115 may vary between the first UE 115 and the second UE 115. In such examples, the first DCI 305 (including the control information that is common to both the first UE 115 and the second UE 115) may include control information associated with such shared characteristics, the second DCI 310-*a* may include control information associated with the unique characteristics of the communications between the base station 105 and the first UE 115, and the second DCI 310-*b* may include control information associated with the unique characteristics of the communications between the base station 105 and the second UE 115.

For example, the resource allocation 315-*a* and the resource allocation 315-*b* may share a same time resource (the base station 105 may communicate with the first UE 115 and the second UE 115 simultaneously) and the first DCI 305 may include control information associated with the common time resource of the resource allocation 315-*a* and the resource allocation 315-*b*. In some examples, the first UE 115 and the second UE 115 may communicate with the base station 105 using a same set of spatial layers and, as such, the first DCI 305 may include control information associated with the set of spatial layers for both the first UE 115 and the second UE 115. In some other examples, the first UE 115 may communicate with the base station 105 using a first spatial layer and the second UE 115 may communicate with the base station 105 using a second spatial layer different than the first spatial layer and, as such, the second DCI 310-*a* may include control information associated with the first spatial layer and the second DCI 310-*b* may include control information associated with the second spatial layer. The control information associated with one or more spatial layers for a UE 115 may be any of a beam indication including, for example, a TCI or spatial relationship information, a DMRS port indication, a power control command, or precoder information indication.

Additionally or alternatively, the resource allocation 315-*a* and the resource allocation 315-*b* may share a same frequency resource or may use different frequency resources and the base station 105 may include control information associated with the frequency resources allocated to the resource allocation 315-*a* and the resource allocation 315-*b* in the first DCI 305 or the second DCI 310 accordingly. Additionally or alternatively, the first UE 115 may have a first DMRS configuration and the second UE 115 may have a second DMRS configuration and, as such, the second DCI 310-*a* may include control information associated with the first DMRS configuration and the second DCI 310-*b* may include control information associated with the second DMRS configuration.

Regardless of what control information is common to both the first UE 115 and the second UE 115 (or to the resource allocation 315-*a* and the resource allocation 315-*b*), the first UE 115 may determine the resource allocation 315-*a* based on receiving the first DCI 305 and the second DCI 310-*a* and may communicate with the base station 105 over the determined resource allocation 315-*a*. Similarly, the second UE 115 may determine the resource allocation 315-*b* based on receiving the first DCI 305 and the second DCI 310-*b* and may communicate with the base station 105 over the determined resource allocation 315-*b*. Further, although illustrated and described in the context of the base station 105 transmitting the first DCI 305 prior to the second DCI 310, the described techniques equivalently apply to examples in which the base station 105 transmits the second DCI 310 prior to the first DCI 305. In such examples, the second DCI 310-*a* and the second DCI 310-*b* may include indications of the resource that the UEs 115 may use for receiving the first DCI 305 or the UEs 115 may buffer a set of resources and decode a resource indicated by the first DCI 305 to receive an associated second DCI 310.

Figure 4:
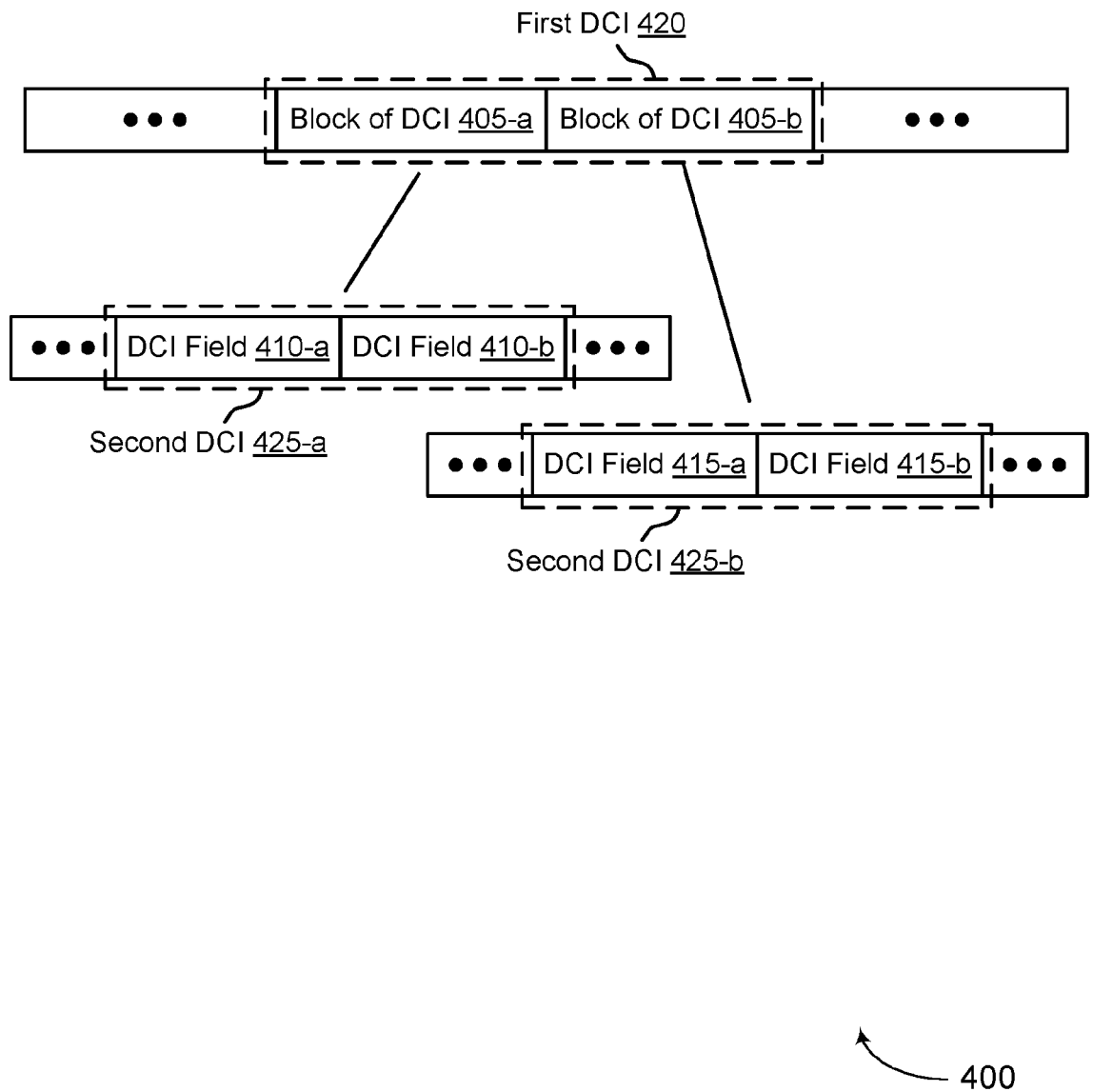
FIGS. 4 and 5 illustrate examples of DCI resource allocations that support two-stage DCI for scheduling UEs in accordance with aspects of the present disclosure.

FIG. 4 illustrates an example of a DCI resource allocation 400 that supports two-stage DCI for scheduling UEs in accordance with aspects of the present disclosure. In some examples, the DCI resource allocation 400 may be implemented by or may implement aspects of the wireless communications system 100 and the wireless communications system 200. The DCI resource allocation 400 illustrates a format of the first DCI 420 and how a UE 115 may determine which indication included in the first DCI 420 is associated with the UE 115 (for example, which indication included in the first DCI 420 indicates a resource over which the UE 115 may receive associated or relevant second DCI 425).

In some examples, the base station 105 or the network may configure or partition the first DCI 420 into blocks of DCI 405, which may be equivalently referred to as blocks or groups of DCI fields included within the first DCI 420. In such examples, the base station 105 may partition the first DCI 420 into a quantity of blocks of DCI 405 equal to or greater than a quantity of UEs 115 within a group of UEs 115 that may receive the first DCI 420 over a first resource. In some examples, the base station 105 may configure each UE 115 with an associated block of DCI 405 via RRC signaling (for example, via RRC configuration) and each block of DCI 405 may include an indication of the existence of a respective second DCI 425 and a resource allocation for receiving the respective second DCI 425 if it exists. As such, each UE 115 may refer to its own block of DCI 405 to determine an indication of a resource to use for receiving second DCI 425 associated with the UE 115. For example, the base station 105 may partition the first DCI 420 into at least a block of DCI 405-*a* and a block of DCI 405-*b*, each block of DCI 405 including its own indication of a resource for receiving second DCI 425, and may configure a first UE 115 to decode the block of DCI 405-*a* and a second UE 115 to decode the block of DCI 405-*b*. Accordingly, the first UE 115 may determine a first indication of a second resource to use for receiving second DCI 425-*a* that is associated with the first UE 115 based on decoding the block of DCI 405-*a* and the second UE 115 may identify a second indication of a third resource to use for receiving second DCI 425-*b* that is associated with the second UE 115.

For example, upon determining the first indication of the second resource to use for receiving the second DCI 425-*a* that is associated with the first UE 115, the first UE 115 may receive the second DCI 425-*a* including a DCI field 410-*a* and a DCI field 410-*b* over the determined second resource. The DCI fields 410 included within the second DCI 425-*a* may include control information (such as DCI indications of configurations or parameters) that are specific to the first UE 115. Similarly, upon determining the second indication of the third resource to use for receiving the second DCI 425-*b* that is associated with the second UE 115, the second UE 115 may receive the second DCI 425-*b* including a DCI field 415-*a* and a DCI field 415-*b* over the determined third resource. The DCI fields 415 included within the second DCI 425-*b* may include control information (such as DCI indications of configurations or parameters) that are specific to the second UE 115.

In some aspects, the first indication and the second indication may indicate the time and frequency resources of the second resource and the third resource, respectively. In some other aspects, the first indication and the second indication may refer to resource selectors included within the first DCI 420. The first UE 115 and the second UE 115 may use such resource selectors to determine a resource to use for receiving the second DCI 425 from a resource pool. In some examples, the base station 105 may include another indication within the first DCI 420 (either within the block of DCI 405 associated with a UE 115 or in a portion of the first DCI 420 common to the group of UEs 115) that indicates the resource pool. In some implementations, the base station 105 may include an indication of a resource pool that is common to the group of UEs 115 and each UE 115 of the group of UEs 115 may determine a different resource to use for receiving a respective second DCI 425 from the common resource pool based on a resource selector included within an associated block of DCI 405. In some other implementations, the base station 105 may include an indication of a resource pool that is specific to a UE 115 of the group of UEs 115 within an associated block of DCI 405 such that each UE 115 may, upon decoding an associated block of DCI 405, determine a UE-specific resource pool and a resource selector to use to determine a resource to use for receiving associated second DCI 425 from the UE-specific resource pool. In some other examples, the resource pool may be pre-configured at the UE 115 (such as via other signaling from the base station 105, based on a hardware setup, or based on a specification). Additional details relating to the indication of the resource pool and a resource selector are described herein, including with reference to FIG. 5.

Figure 5:
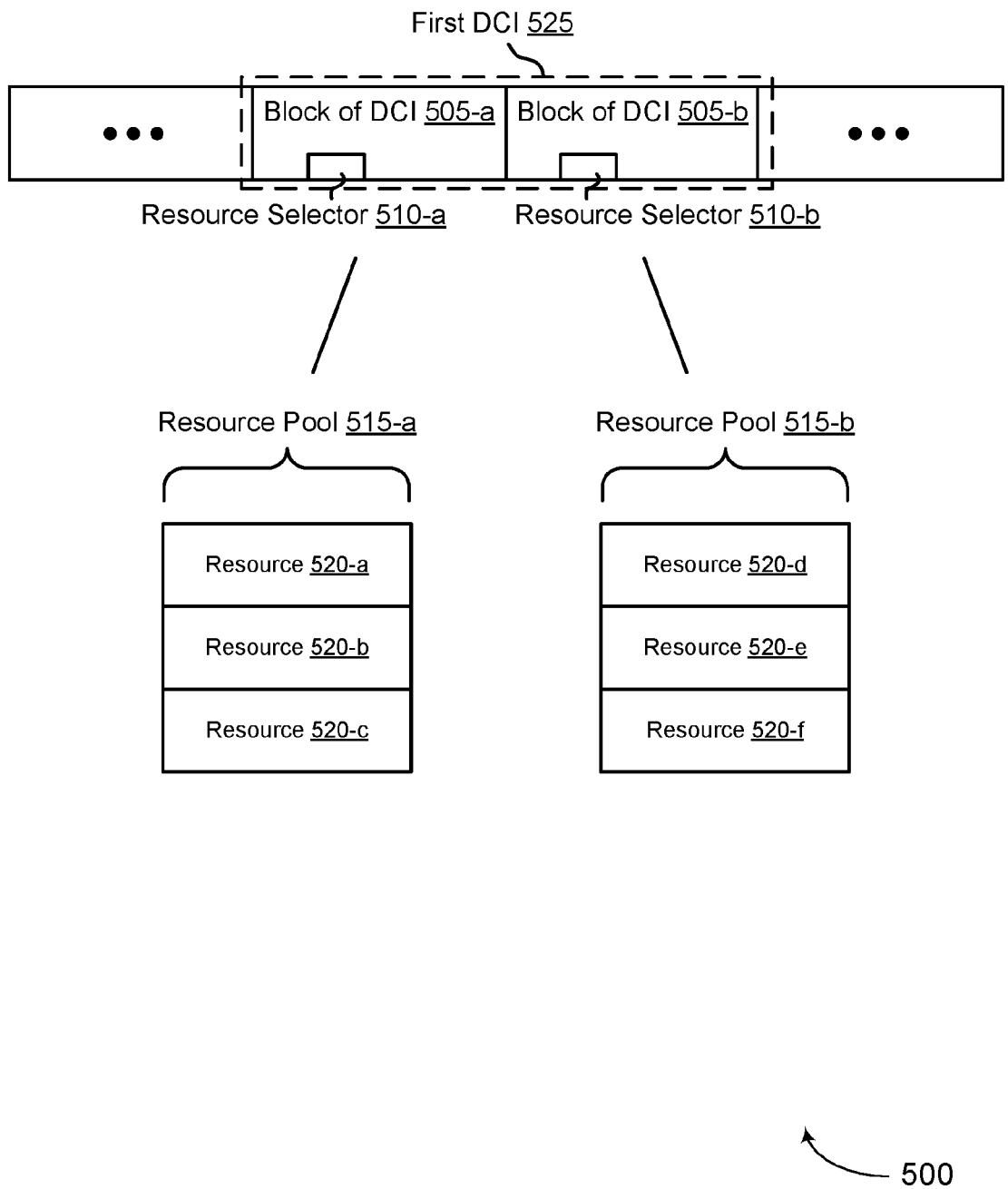

FIG. 5 illustrates an example of a DCI resource allocation 500 that supports two-stage DCI for scheduling UEs in accordance with aspects of the present disclosure. In some examples, the DCI resource allocation 500 may be implemented by or may implement aspects of the wireless communications system 100 and the wireless communications system 200. The DCI resource allocation 500 illustrates a format of the first DCI 525 and how a UE 115 may determine a resource 520 to use for receiving second DCI based on an indicated or configured resource pool and a resource selector 510.

As described with reference to FIG. 4, a base station 105 may configure (via RRC signaling) a block of DCI 505-*a* of the first DCI 525 for a first UE 115 and may configure a block of DCI 505-*b* of the first DCI 525 for a second UE 115. In some examples, the first UE 115 may determine a resource selector 510-*a* based on decoding the block of DCI 505-*a* and may use the resource selector 510-*a* to determine a resource 520 to use for receiving second DCI that includes control information that is specific to the first UE 115. Similarly, the second UE 115 may determine a resource selector 510-*b* based on decoding the block of DCI 505-*b* and may use the resource selector 510-*b* to determine a resource 520 to use for receiving second DCI that includes control information that is specific to the second UE 115.

In some implementations, the base station 105 may transmit an indication of a common resource pool 515 to the first UE 115 and the second UE 115 in the first DCI 525. In some examples, the base station 105 may include the indication of the common resource pool 515 within a portion of the first DCI 525 that is decoded by both the first UE 115 and the second UE 115. In some other examples, the base station 105 may include an indication of the common PDSCH resource pool 515 within each block of DCI 505 such that the first UE 115 and the second UE 115 may determine the common resource pool 515 upon decoding the block of DCI 505-*a* and the block of DCI 505-*b*, respectively.

In some aspects, the common resource pool 515 may include a set of resources 520 (a set of defined resources 520) of a PDSCH and the first UE 115 and the second UE 115 may determine a resource to use for receiving second DCI from the set of resources 520 of the common resource pool 515. For example, the common resource pool 515 may be illustrated by resource pool 515-*a* and may include a resource 520-*a*, a resource 520-*b*, and a resource 520-*c* and the first UE 115 and the second UE 115 may each determine to use one of the resource 520-*a*, the resource 520-*b*, or the resource 520-*c* to receive associated second DCI based on a value of the resource selector 510-*a* and a value of the resource selector 510-*b*.

In some aspects, a first value of a resource selector 510 (for example, a resource selector 510 with a value equal to 1) may be associated with or mapped to the resource 520-*a*, a second value of a resource selector 510 (for example, a resource selector 510 with a value equal to 2) may be associated with or mapped to the resource 520-*b*, and a third value of a resource selector 510 (for example, a resource selector 510 with a value equal to 3) may be associated with or mapped to the resource 520-*c*.

As such, the first UE 115 may determine which resource 520 of the common resource pool 515 to use based on the value of the resource selector 510-*a* included within the block of DCI 505-*a* and the second UE 115 may determine which resource 520 of the common resource pool 515 to use based on the value of the resource selector 510-*b* included within the block of DCI 505-*b*. For example, the base station 105 may set the resource selector 510-*a* to a value equal to 1 and may set the resource selector 510-*b* to a value equal to 2 and, accordingly, the first UE 115 may determine to use the resource 520-*a* to receive the second DCI associated with the first UE 115 and the second UE 115 may determine to use the resource 520-*b* to receive the second DCI associated with the second UE 115. Likewise, the base station 105 may transmit the second DCI including control information that is specific to the first UE 115 to the first UE 115 over the resource 520-*a* and may transmit the second DCI including control information that is specific to the second UE 115 to the second UE 115 over the resource 520-*b*.

In some examples, based on receiving an indication of the common resource pool 515 from which each of the first UE 115 and the second UE 115 may determine resources 520 to use for receiving associated second DCI, one or both of the first UE 115 or the second UE 115 may determine the resource 520 used by another UE 115 of the group of UEs 115 to receive second DCI because the indication of the common resource pool 515 and the resource selectors 510 for each UE 115 of the group of UEs 115 are included within the first DCI 525 that may be received by all UEs 115 of the group of UEs 115. For example, the first UE 115 may determine the resource 520 carrying the second DCI associated with the first UE 115 and may additionally determine the resource 520 (a different resource 520) carrying the second DCI associated with the second UE 115 (if the first UE 115 knows a UE-specific RNTI associated with the second UE 115 used to scramble the second DCI associated with the second UE 115). In such examples, the first UE 115 may determine control information that is specific to the second UE 115 in addition to the control information that is specific to the first UE 115 and may make some operational or functional decisions based on determining the control information that is specific to the second UE 115, which may result in more cooperative operation between the first UE 115 and the second UE 115.

In some other implementations, the base station 105 or an initial hardware setup may pre-configure a UE-specific resource pool 515 at each of the first UE 115 and the second UE 115 and the first UE 115 and the second UE 115 may accordingly determine a resource 520 to use for receiving associated second DCI from their respective resource pools 515. For example, the first UE 115 may be pre-configured with the resource pool 515-*a* including the resource 520-*a*, the resource 520-*b*, and the resource 520-*c* and the second UE 115 may be pre-configured with a resource pool 515-*b* including a resource 520-*d*, a resource 520-*e*, and a resource 520-*f*. In such examples, the first UE 115 may use the resource selector 510-*a* to determine a resource 520 from the resource pool 515-*a* and the second UE 115 may use the resource selector 510-*b* to determine a resource 520 from the resource pool 515-*b*. In examples in which each UE 115 is pre-configured with a separate or independent resource pool 515, the base statin 105 may avoid transmitting an indication of the resource pool 515 in the first DCI 525, which may reduce overhead associated with the first DCI 525.

In some aspects, a first value of the resource selector 510-*a* (for example, a resource selector 510-*a* with a value equal to 1) may be associated with or mapped to the resource 520-*a*, a second value of a resource selector 510-*a* (for example, a resource selector 510-*a* with a value equal to 2) may be associated with or mapped to the resource 520-*b*, and a third value of a resource selector 510-*a* (for example, a resource selector 510-*a* with a value equal to 3) may be associated with or mapped to the resource 520-*c*. Similarly, a first value of the resource selector 510-*b* (for example, a resource selector 510-*b* with a value equal to 1) may be associated with or mapped to the resource 520-*d*, a second value of the resource selector 510-*b* (for example, a resource selector 510-*b* with a value equal to 2) may be associated with or mapped to the resource 520-*e*, and a third value of the resource selector 510-*b* (for example, a resource selector 510-*b* with a value equal to 3) may be associated with or mapped to the resource 520-*f*. Accordingly, the first UE 115 and the second UE 115 may determine which resource 520 to use to receive associated second DCI based on determining the value of the resource selector 510-*a* and the resource selector 510-*b*, respectively. For example, the base station 105 may set the resource selector 510-*a* to a value equal to 2 and may set the resource selector 510-*b* to a value equal to 3 and, accordingly, the first UE 115 may determine to use the resource 520-*b* to receive the second DCI associated with the first UE 115 and the second UE 115 may determine to use the resource 520-*f* to receive the second DCI associated with the second UE 115. Likewise, the base station 105 may transmit the second DCI including control information that is specific to the first UE 115 to the first UE 115 over the resource 520-*b* and may transmit the second DCI including control information that is specific to the second UE 115 to the second UE 115 over the resource 520-*f*.

Figure 6:
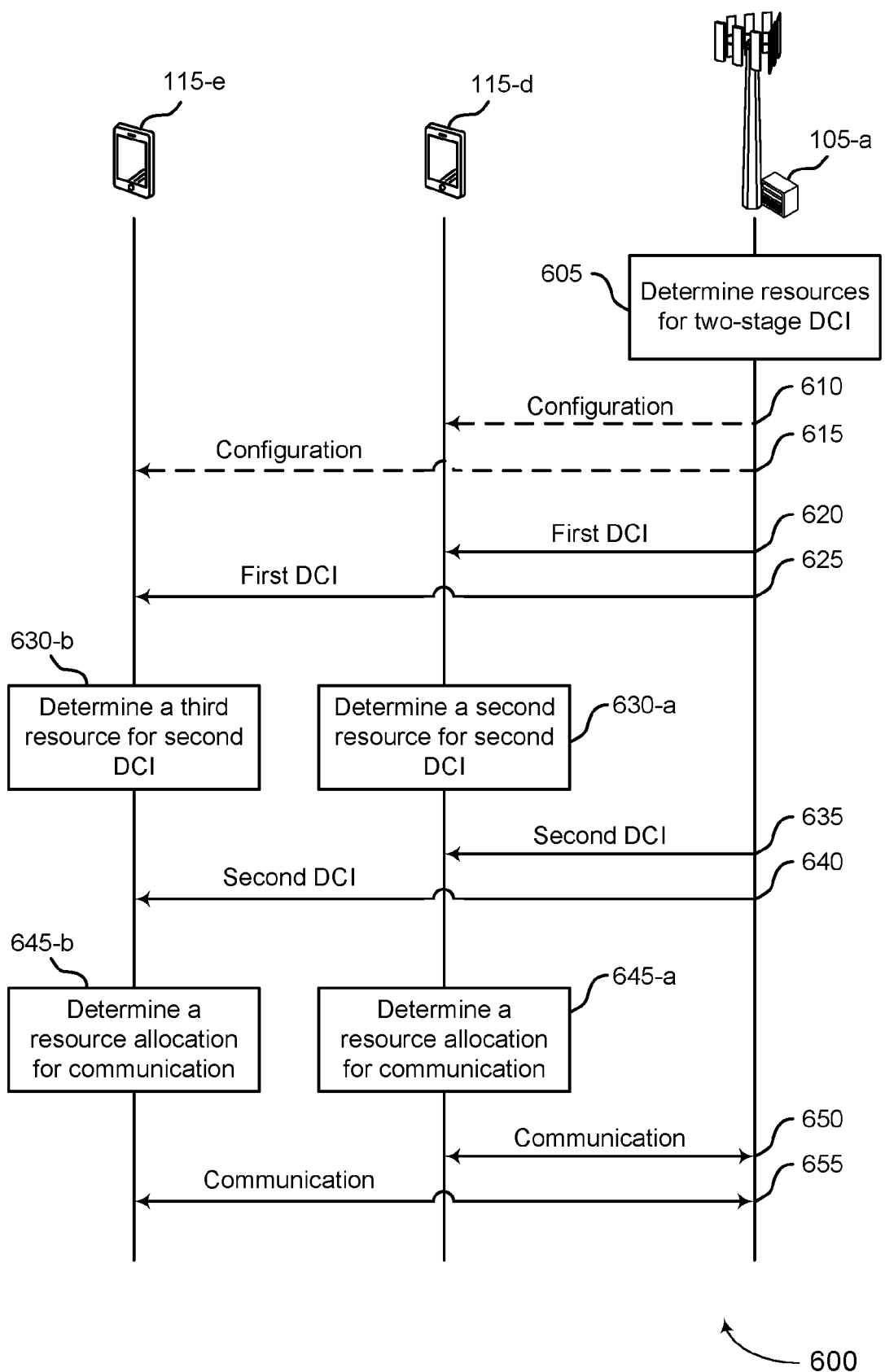
FIG. 6 illustrates an example of a process flow that supports two-stage DCI for scheduling UEs in accordance with aspects of the present disclosure.

FIG. 6 illustrates an example of a process flow 600 that supports two-stage DCI for scheduling UEs in accordance with aspects of the present disclosure. In some examples, the process flow 600 may be implemented by or may implement aspects of the wireless communications system 100 and the wireless communications system 200. The process flow 600 may include a base station 105-*a*, a UE 115-*d*, and a UE 115-*e*, which may be examples of corresponding devices described with reference to FIGS. 1-5. In some examples, the base station 105-*a* may transmit first stage DCI to the UE 115-*d* and the UE 115-*e* including control information that is common to the UE 115-*d* and the UE 115-*e* and indications of second resources over which the UE 115-*d* and the UE 115-*e* may receive second stage DCI including UE-specific control information. Alternative examples of the process flow may be implemented, in which some features are performed in a different order than described or are not performed at all. In some examples, operations may include additional features not mentioned below, or further operations may be added.

At 605, the base station 105-*a*, which may function as a TRP for the UE 115-*d* and the UE 115-*e*, may determine resources for the two-stage DCI. For example, the base station 105-*a* may determine a first resource over which to transmit the first DCI (first stage DCI) to both the UE 115-*d* and the UE 115-*e* and may determine resources for transmitting the second DCI (second stage DCI) to the UE 115-*d* and the UE 115-*e* separately. In some examples, for instance, the base station 105-*a* may determine a second resource over which the base station 105-*a* may transmit second DCI to the UE 115-*d* (the second DCI including control information that is specific to the UE 115-*d*) and may determine a third resource over which the base station 105-*a* may transmit second DCI to UE 115-*e* (the second DCI including control information that is specific to the UE 115-*e*). Additionally, in some implementations, the base station 105-*a* may determine a resource allocation for communication between the base station 105-*a* and the UE 115-*d* and the UE 115-*e*.

At 610, the base station 105-*a* may, in some implementations, transmit an indication of a configuration to the UE 115-*d*. In some examples, the configuration may indicate that a first block of DCI of the first DCI is associated with the UE 115-*d*. At 615, the base station 105-*a* may, in some implementations, transmit an indication of a configuration to the UE 115-*e*. In some examples, the configuration may indicate that a second block of DCI of the first DCI different than the first block of DCI is associated with the UE 115-*e*. In examples in which the base station 105-*a* transmits an indication of a configuration to the UE 115-*d* and the UE 115-*e* indicating which block of DCI (such as which block of DCI fields) of the first DCI are associated with each of the UE 115-*d* and the UE 115-*e*, the UE 115-*d* and the UE 115-*e* may each decode their associated block of DCI to determine an indication of a respective resource to use for receiving associated or relevant second DCI. In some aspects, the base station 105-*a* may transmit the indication of the configuration to the UE 115-*d* and the UE 115-*e* via RRC signaling.

At 620, the base station 105-*a* may transmit the first DCI to the UE 115-*d*. At 625, the base station 105-*a* may transmit the first DCI to the UE 115-*e*. In some examples, the base station 105-*a* may broadcast the first DCI to a group of UEs 115 including the UE 115-*d* and the UE 115-*e* over the first resource and, in such examples, the base station 105-*a* may perform the operations shown at 620 and 625 simultaneously or as one operation (for example, as one transmission).

In some implementations, the UE 115-*d* and the UE 115-*e* may receive the first DCI based on monitoring a search space set of a CORESET and blind decoding over the search space set (which may include at least the first resource carrying the first DCI). The first DCI may include a first indication of the second resource that the UE 115-*d* may use for receiving second DCI associated with the UE 115-*d* and a second indication of the third resource that the UE 115-*e* may use for receiving second DCI associated with the UE 115-*e*. As described in more detail with reference to FIG. 2, the first DCI may include UE group-common control information, such as control information that is common to both the UE 115-*d* and the UE 115-*e*.

At 630-*a*, the UE 115-*d* may determine the second resource to use for receiving the second DCI including control information that is specific to the UE 115-*d* based on the first indication in the first DCI. In some implementations, the base station 105-*a* may include the first indication within the first block of DCI of the first DCI that is associated with the UE 115-*d* (based on the configuration at 610). In some examples, the UE 115-*d* may determine the second resource for the second DCI from a resource pool based on the first indication in the first DCI. As described in more detail with reference to FIGS. 4 and 5, the first indication may indicate the resource pool or may be a resource selector that the UE 115-*d* may use to determine the second resource from the resource pool.

At 630-*b*, the UE 115-*e* may determine the third resource to use for receiving the second DCI including control information that is specific to the UE 115-*e* based on the second indication in the first DCI. In some implementations, the base station 105-*a* may include the second indication within the second block of DCI of the first DCI that is associated with the UE 115-*e* (based on the configuration at 615). In some examples, the UE 115-*e* may determine the third resource for the second DCI from a resource pool based on the second indication in the first DCI. As described in more detail with reference to FIGS. 4 and 5, the second indication may indicate the resource pool or may be a resource selector that the UE 115-*e* may use to determine the second resource from the resource pool.

At 635, the UE 115-*d* may receive the second DCI from the base station 105-*a* over the second resource, the second DCI including control information that is specific to the UE 115-*d*. At 640, the UE 115-*e* may receive the second DCI from the base station 105-*a* over the third resource, the second DCI including control information that is specific to the UE 115-*e*. In some examples, one or both of the UE 115-*d* or the UE 115-*e* may receive the second DCI based on monitoring a search space set of a CORESET for the second DCI, the search space set including one or both of the second resource or the third resource. In some other examples, one or both of the UE 115-*d* or the UE 115-*e* may receive the second DCI over a PDSCH resource (a resource of a PDSCH resource pool) as indicated by the first DCI.

At 645-*a*, the UE 115-*d* may determine a first resource allocation to use for communication between the base station 105-*a* and the UE 115-*d* based on receiving the first DCI and the second DCI that is associated with the UE 115-*d*. Similarly, at 645-*b*, the UE 115-*e* may determine a second resource allocation to use for communication between the base station 105-*a* and the UE 115-*e* based on receiving the first DCI and the second DCI that is associated with the UE 115-*e*. The resource allocations may include resources of a PDSCH or a PUSCH. Additional details relating to the resource allocations over which the UE 115-*d* and the UE 115-e may communicate with the base station 105-a are described with reference to FIG. 3.

At 650, the UE 115-d may communicate with the base station 105-a over the determined resource allocation. At 655, the UE 115-e may communicate with the base station 105-a over the determined resource allocation. In some aspects, the UE 115-d and the UE 115-e may communicate with the base station 105-a as distributed panels of a set of distributed panels. Additionally, the UE 115-d and the UE 115-e may communicate with each other and make operational decisions based on sidelink communications, as described in more detail with reference to FIG. 2.

Figure 7:
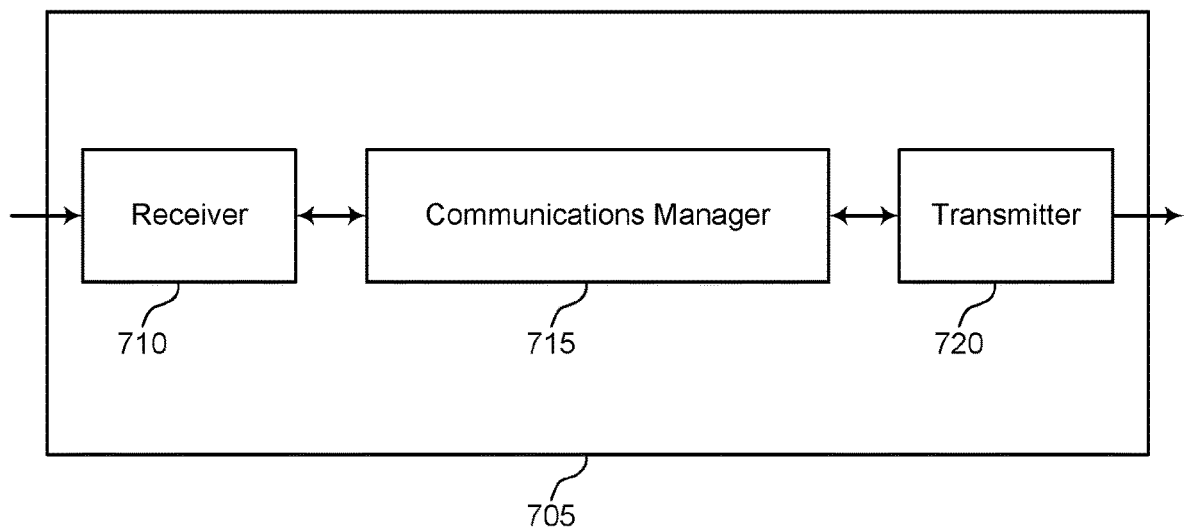
FIGS. 7 and 8 show block diagrams of devices that support two-stage DCI for scheduling UEs in accordance with aspects of the present disclosure.

FIG. 7 shows a block diagram of a device 705 that supports two-stage DCI for scheduling UEs in accordance with aspects of the present disclosure. The device 705 may be an example of aspects of a UE 115. The device 705 may include a receiver 710, a communications manager 715, and a transmitter 720. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to two-stage DCI for scheduling UEs). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, first DCI over a first resource, the first DCI including an indication and first control information common to a group of UEs including the UE, receive, from the base station, the second DCI over the second resource, the second DCI including second control information specific to the UE, and determine a second resource for second DCI based on the indication in the first DCI. The communications manager 715 may be an example of aspects of the communications manager 1010 described herein.

The communications manager 715 may be implemented to realize one or more potential advantages. Some implementations may allow the device 705 to determine a resource to use for receiving second stage DCI including control information that is specific to the device 705 based on an indication in first stage DCI including control information that is common to a group of devices including the device 705. As such, the device 705 may refrain from performing blind decoding over a search space set to receive the second stage DCI because the device 705 knows over which resource a base station will transmit the second stage DCI, which may consume less battery power or less of the processing capability of the device 705. In examples in which the device 705 uses less battery power to receive two-stage DCI, the device 705 may experience increased power savings and longer battery life. In examples in which the device 705 uses less of the processing capability of the device 705 to receive two-stage DCI, which may be in addition or alternatively to using less battery power, one or more processing components of the device 705 may use the freed processing capability of the device 705 to perform other processing tasks for the device 705, which may increase the achievable throughput of the device 705 and enhance a user experience.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
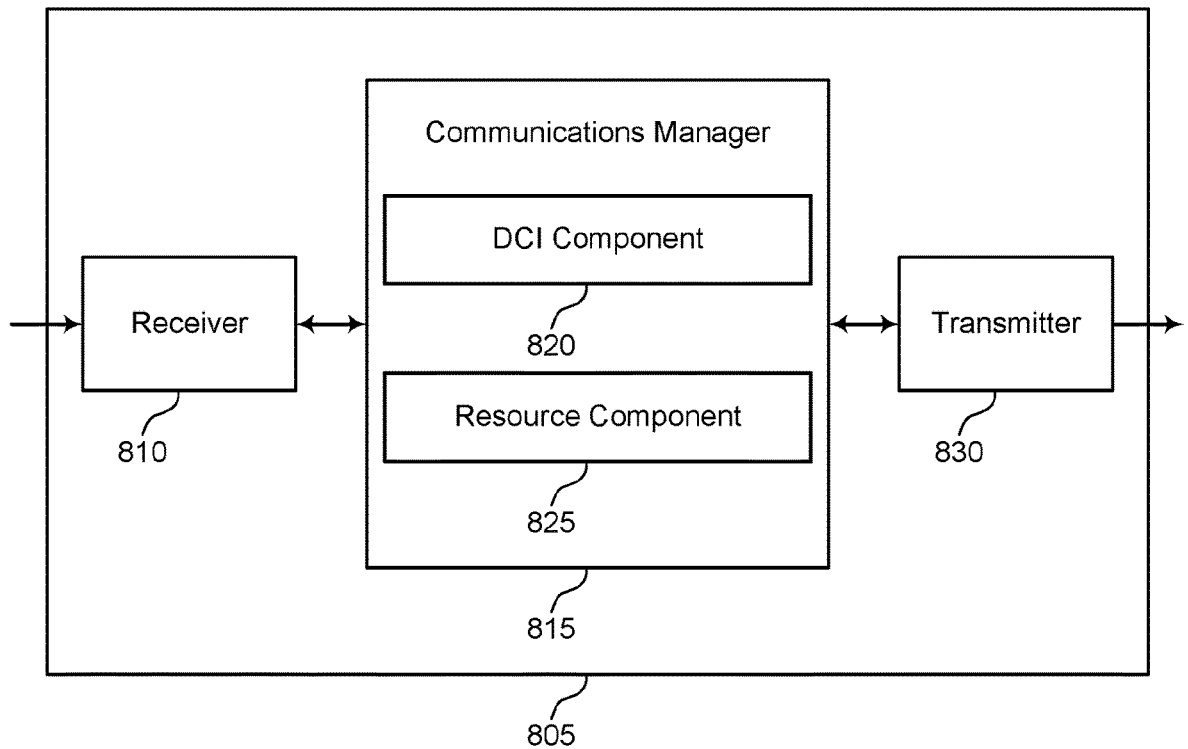

FIG. 8 shows a block diagram of a device 805 that supports two-stage DCI for scheduling UEs in accordance with aspects of the present disclosure. The device 805 may be an example of aspects of a device 705, or a UE 115. The device 805 may include a receiver 810, a communications manager 815, and a transmitter 830. The communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to two-stage DCI for scheduling UEs). Information may be passed on to other components of the device 805. The receiver 810 may be an example of aspects of the transceiver 1020 described with reference to FIG. 10. The receiver 810 may utilize a single antenna or a set of antennas. The communications manager 815 may include a DCI component 820 and a resource component 825.

The DCI component 820 may receive, from a base station, first DCI over a first resource, the first DCI including an indication and first control information common to a group of UEs including the UE and receive, from the base station, the second DCI over the second resource, the second DCI including second control information specific to the UE. The resource component 825 may determine a second resource for second DCI based on the indication in the first DCI.

The transmitter 830 may transmit signals generated by other components of the device 805. In some examples, the transmitter 830 may be collocated with a receiver 810 in a transceiver component. For example, the transmitter 830 may be an example of aspects of the transceiver 1020 described with reference to FIG. 10. The transmitter 830 may utilize a single antenna or a set of antennas.

Figure 9:
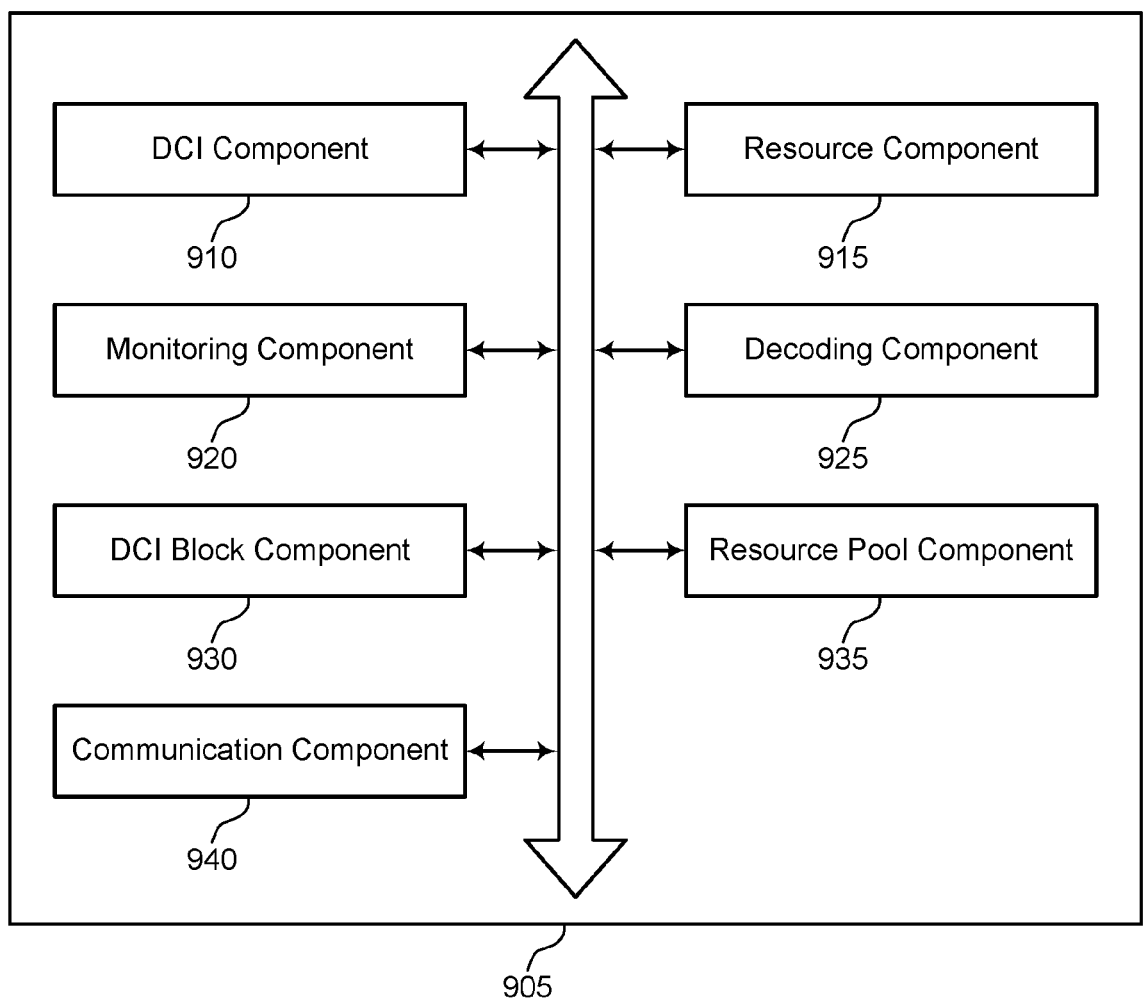
FIG. 9 shows a block diagram of a communications manager that supports two-stage DCI for scheduling UEs in accordance with aspects of the present disclosure.

FIG. 9 shows a block diagram of a communications manager 905 that supports two-stage DCI for scheduling UEs in accordance with aspects of the present disclosure. The communications manager 905 may include a DCI component 910, a resource component 915, a monitoring component 920, a decoding component 925, a DCI block component 930, a resource pool component 935, and a communication component 940. Each of these components may communicate, directly or indirectly, with one another (for example, via one or more buses).

The DCI component 910 may receive, from a base station, first DCI over a first resource, the first DCI including an indication and first control information common to a group of UEs including the UE. In some examples, the DCI component 910 may receive, from the base station, the second DCI over the second resource, the second DCI including second control information specific to the UE. In some examples, the DCI component 910 may receive the second DCI over a PDSCH based on determining the second resource, the PDSCH including the second resource.

The resource component 915 may determine a second resource for second DCI based on the indication in the first DCI. In some examples, the resource component 915 may determine a value of a resource selector associated with the UE, the resource selector included in the first DCI and, in some examples, determining the second resource from the resource pool is based on the value of the resource selector. In some examples, the resource component 915 may determine a value of a resource selector associated with the UE. In some examples, the indication in the first DCI includes the resource selector and determining the second resource from the resource pool is based on the value of the resource selector.

The monitoring component 920 may monitor a search space set of a CORESET for the first DCI, the search space set including the first resource. In some examples, the monitoring component 920 may monitor a search space set of a CORESET for the second DCI based on determining the second resource, the search space set including the second resource and, in some examples, receiving the second DCI is based on the monitoring.

The decoding component 925 may blind decoding at least the first resource and, in some examples, receiving the first DCI is based on the blind decoding. In some examples, the decoding component 925 may decode the scrambled first DCI based on the radio network temporary identifier that is common to the group of UEs. In some examples, the decoding component 925 may decode the scrambled second DCI based on the radio network temporary identifier that is specific to the UE. In some examples, the decoding component 925 may decode the block of DCI of the first DCI.

The DCI block component 930 may receive, from the base station, an indication of a configuration, the configuration indicating that a block of DCI of the first DCI is associated with the UE. In some examples, the block of DCI includes a second indication of one or more of an existence of the second DCI or a resource allocation for the second DCI. In some examples, the indication of the configuration is received via RRC signaling.

The resource pool component 935 may determine the second resource for the second DCI from a resource pool based on the indication in the first DCI. In some examples, the resource pool component 935 may determine the resource pool based on the indication in the first DCI. In some examples, the resource pool component 935 may determine the resource pool based on a resource pool configuration. In some examples, the resource pool configuration is pre-configured at the UE.

The communication component 940 may determine a resource allocation for communication between the base station and the UE based on receiving the first DCI and the second DCI. In some examples, the communication component 940 may communicate with the base station over the resource allocation. In some examples, the communication component 940 may communicate with the base station as a distributed panel of the set of distributed panels.

Figure 10:
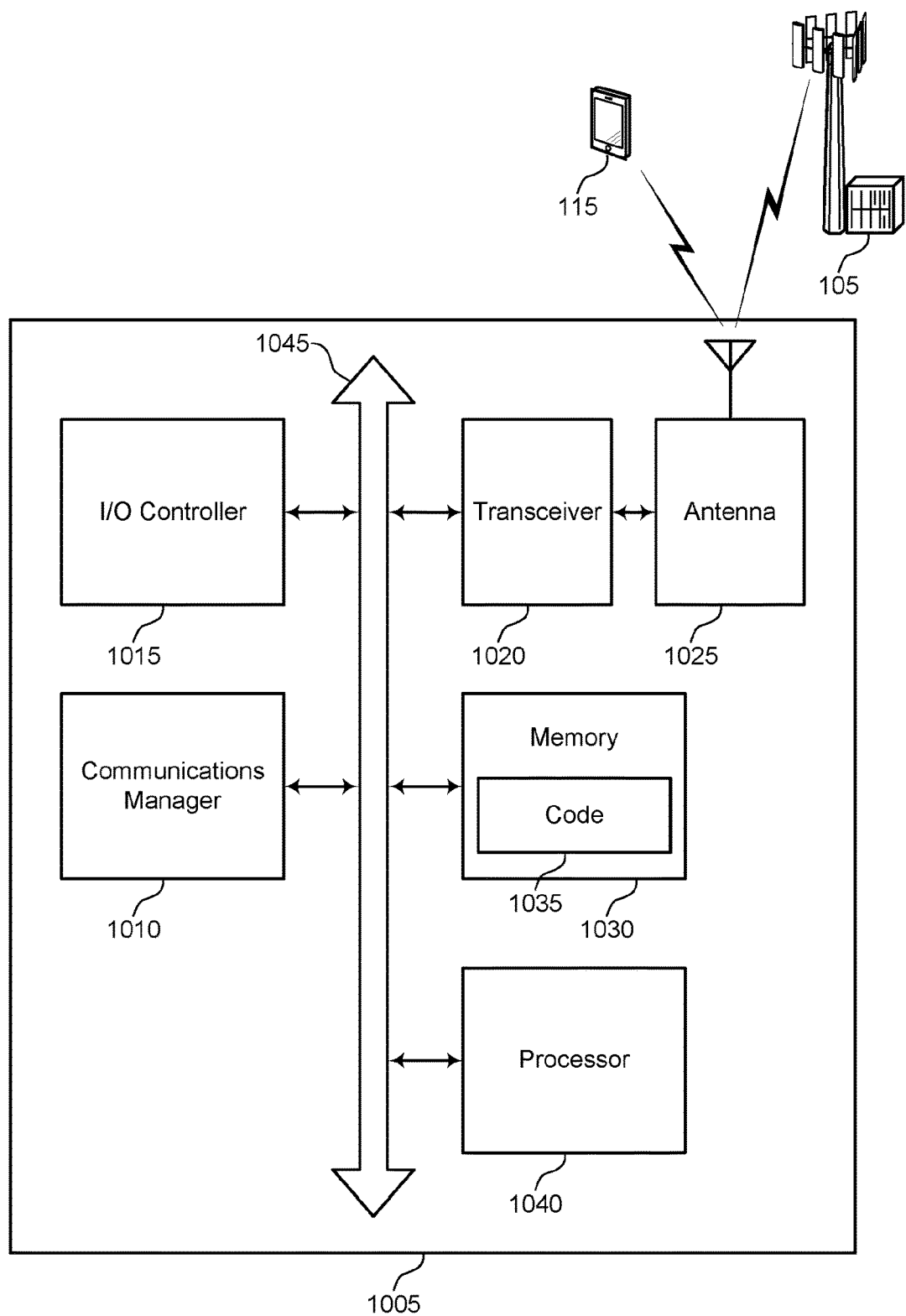
FIG. 10 shows a diagram of a system including a device that supports two-stage DCI for scheduling UEs in accordance with aspects of the present disclosure.

FIG. 10 shows a diagram of a system including a device 1005 that supports two-stage DCI for scheduling UEs in accordance with aspects of the present disclosure. The device 1005 may be an example of or include the components of device 705, device 805, or a UE 115. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (for example, bus 1045).

The communications manager 1010 may receive, from a base station, first DCI over a first resource, the first DCI including an indication and first control information common to a group of UEs including the UE, receive, from the base station, the second DCI over the second resource, the second DCI including second control information specific to the UE, and determine a second resource for second DCI based on the indication in the first DCI.

The I/O controller 1015 may manage input and output signals for the device 1005. The I/O controller 1015 may also manage peripherals not integrated into the device 1005. In some examples, the I/O controller 1015 may represent a physical connection or port to an external peripheral. In some examples, the I/O controller 1015 may utilize an operating system such as iOS®, ANDROID®, MS-DOS®, MS-WINDOWS®, OS/2®, UNIX®, LINUX®, or another known operating system. In other examples, the I/O controller 1015 may represent or interact with a modem, a keyboard, a mouse, a touchscreen, or a similar device. In some examples, the I/O controller 1015 may be implemented as part of a processor. In some examples, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some examples, the wireless device may include a single antenna 1025. However, in some examples the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some examples, the memory 1030 may contain, among other things, a basic I/O system (BIOS) which may control basic hardware or software operation such as the interaction with peripheral components or devices.

The processor 1040 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 1040 may be configured to operate a memory array using a memory controller. In other examples, a memory controller may be integrated into the processor 1040. The processor 1040 may be configured to execute computer-readable instructions stored in a memory (for example, the memory 1030) to cause the device 1005 to perform various functions (for example, functions or tasks supporting two-stage DCI for scheduling UEs).

The code 1035 may include instructions to implement aspects of the present disclosure, including instructions to support wireless communications. The code 1035 may be stored in a non-transitory computer-readable medium such as system memory or other type of memory. In some examples, the code 1035 may not be directly executable by the processor 1040 but may cause a computer (for example, when compiled and executed) to perform functions described herein.

Figure 11:
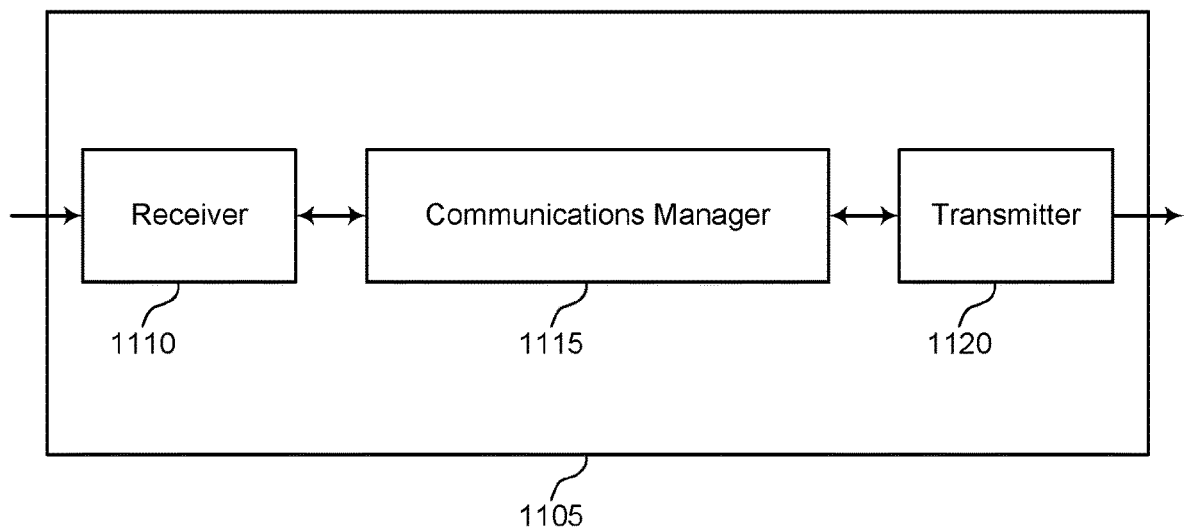
FIGS. 11 and 12 show block diagrams of devices that support two-stage DCI for scheduling UEs in accordance with aspects of the present disclosure.

FIG. 11 shows a block diagram of a device 1105 that supports two-stage DCI for scheduling UEs in accordance with aspects of the present disclosure. The device 1105 may be an example of aspects of a base station 105 or a TRP 205. The device 1105 may include a receiver 1110, a communications manager 1115, and a transmitter 1120. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to two-stage DCI for scheduling UEs). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a first resource for transmitting first DCI to a group of UEs including a UE and a second resource for transmitting second DCI to the UE, transmit, to the group of UEs, the first DCI over the first resource, the first DCI including an indication of the second resource for the second DCI and first control information common to the group of UEs, and transmit, to the UE, the second DCI over the second resource, the second DCI including control information specific to the UE.

The communications manager 1110 may be implemented to realize one or more potential advantages. Some implementations may enable the device 1105 to broadcast control information that is common to a group of UEs in first stage DCI over a first resource and unicast control information that is specific to a UE in second stage DCI over a second resource that is indicated in the first stage DCI. As such, the device 1105 may refrain from potentially redundantly transmitting control information that is common to the group of UEs to each UE separately and may additionally enable each UE of the group of UEs to determine the second resource over which the device 1105 transmits the second stage DCI based on receiving the first stage DCI. Based on including an indication of the second resource over which the device 1105 will transmit the second stage DCI, the device 1105 may reduce the amount of resources a UE may monitor for the second stage DCI and, as such, may schedule more communication between the device 1105 and the UE, which may result in more efficient resource allocation and increase the achievable throughput of the system.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
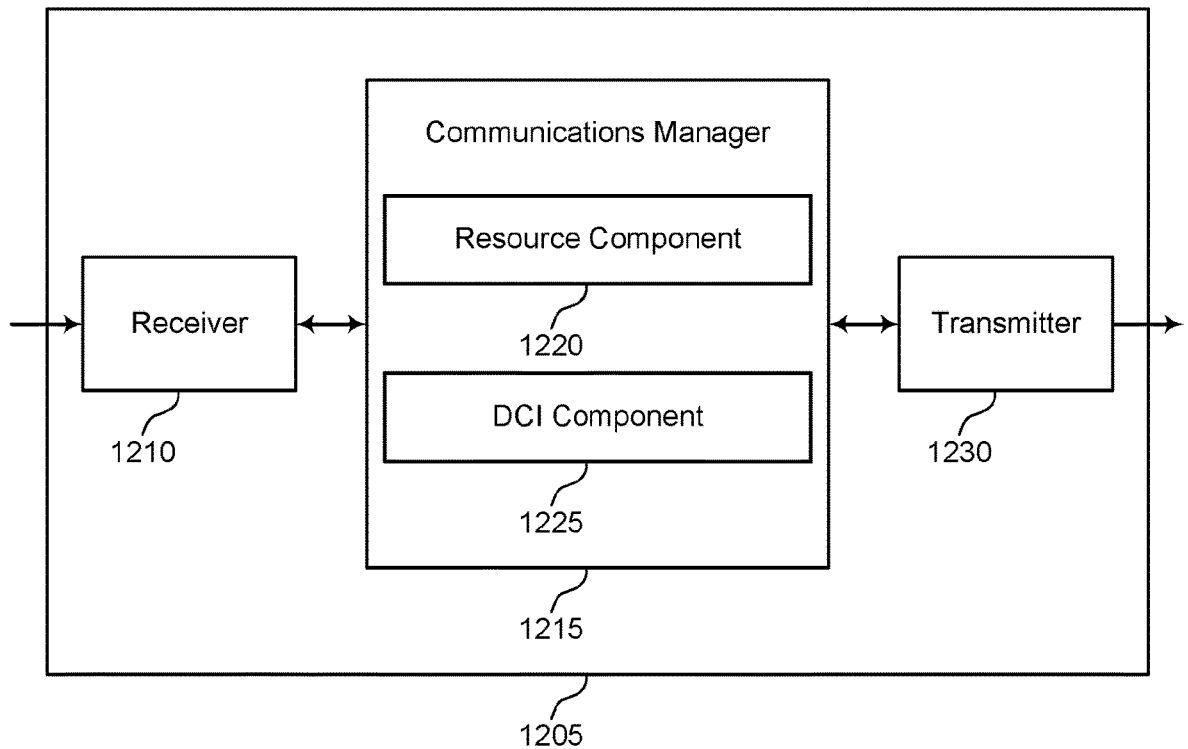

FIG. 12 shows a block diagram of a device 1205 that supports two-stage DCI for scheduling UEs in accordance with aspects of the present disclosure. The device 1205 may be an example of aspects of a device 1105, a base station 105, or a TRP 205. The device 1205 may include a receiver 1210, a communications manager 1215, and a transmitter 1230. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to two-stage DCI for scheduling UEs). Information may be passed on to other components of the device 1205. The receiver 1210 may be an example of aspects of the transceiver 1420 described with reference to FIG. 14. The receiver 1210 may utilize a single antenna or a set of antennas. The communications manager 1215 may include a resource component 1220 and a DCI component 1225.

The resource component 1220 may determine a first resource for transmitting first DCI to a group of UEs including a UE and a second resource for transmitting second DCI to the UE. The DCI component 1225 may transmit, to the group of UEs, the first DCI over the first resource, the first DCI including an indication of the second resource for the second DCI and first control information common to the group of UEs and transmit, to the UE, the second DCI over the second resource, the second DCI including control information specific to the UE.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
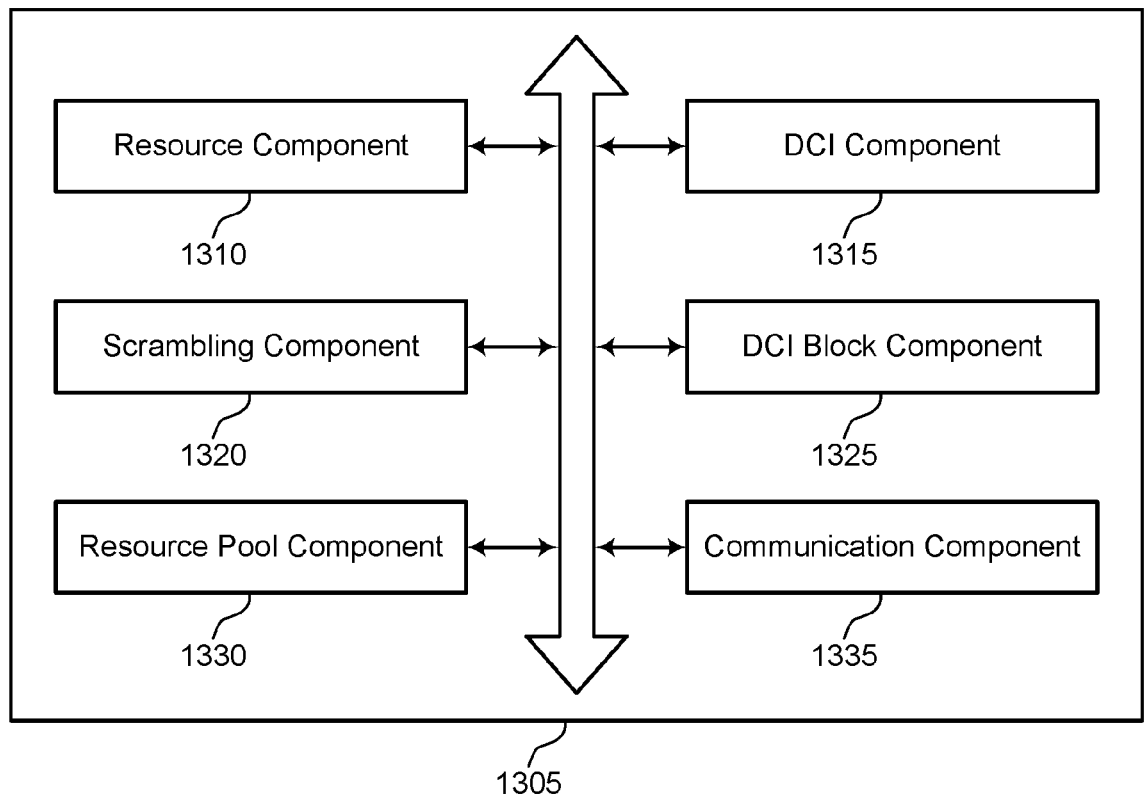
FIG. 13 shows a block diagram of a communications manager that supports two-stage DCI for scheduling UEs in accordance with aspects of the present disclosure.

FIG. 13 shows a block diagram of a communications manager 1305 that supports two-stage DCI for scheduling UEs in accordance with aspects of the present disclosure. The communications manager 1305 may include a resource component 1310, a DCI component 1315, a scrambling component 1320, a DCI block component 1325, a resource pool component 1330, and a communication component 1335. Each of these components may communicate, directly or indirectly, with one another (for example, via one or more buses).

The resource component 1310 may determine a first resource for transmitting first DCI to a group of UEs including a UE and a second resource for transmitting second DCI to the UE. In some examples, the resource component 1310 may transmit, to the UE, a resource selector indicating the second resource from the resource pool in the block of DCI associated with the UE. In some examples, the resource pool is pre-configured at the UE based on a resource pool configuration and the indication included by the first DCI includes a resource selector that indicates the second resource from the resource pool.

The DCI component 1315 may transmit, to the group of UEs, the first DCI over the first resource, the first DCI including an indication of the second resource for the second DCI and first control information common to the group of UEs. In some examples, the DCI component 1315 may transmit, to the UE, the second DCI over the second resource, the second DCI including control information specific to the UE. In some examples, DCI component 1315 may transmit the first DCI over a search space set of a CORESET based on determining the first resource and, in some examples, the search space set includes the first resource.

In some examples, DCI component 1315 may transmit the second DCI over a search space set of a CORESET based on determining the second resource and, in some examples, the search space set includes the second resource. In some examples, DCI component 1315 may transmit the second DCI over a PDSCH based on determining the second resource and, in some examples, the PDSCH includes the second resource. In some examples, the DCI component 1315 may transmit, to the second UE, the third DCI over the third resource, the third DCI including second control information specific to the second UE.

The scrambling component 1320 may scramble the first DCI based on a radio network temporary identifier that is common to the group of UEs. In some examples, the scrambling component 1320 may scramble the second DCI based on a radio network temporary identifier that is specific to the UE.

The DCI block component 1325 may transmit, to the UE, an indication of a configuration, the configuration indicating that a block of DCI of the first DCI is associated with the UE. In some examples, the block of DCI includes a second indication of one or more of an existence of the second DCI or a resource allocation for the second DCI. In some examples, the indication of the configuration is transmitted via RRC signaling.

The resource pool component 1330 may determine a resource pool including the second resource.

The communication component 1335 may determine a resource allocation for communication between the base station and the UE and, in some examples, transmitting the second DCI is based on determining the resource allocation for communication between the base station and the UE. In some examples, the communication component 1335 may communicate with the UE over the resource allocation. In some examples, the communication component 1335 may communicate with the group of UEs as a transmission and reception point in a network of distributed panels.

Figure 14:
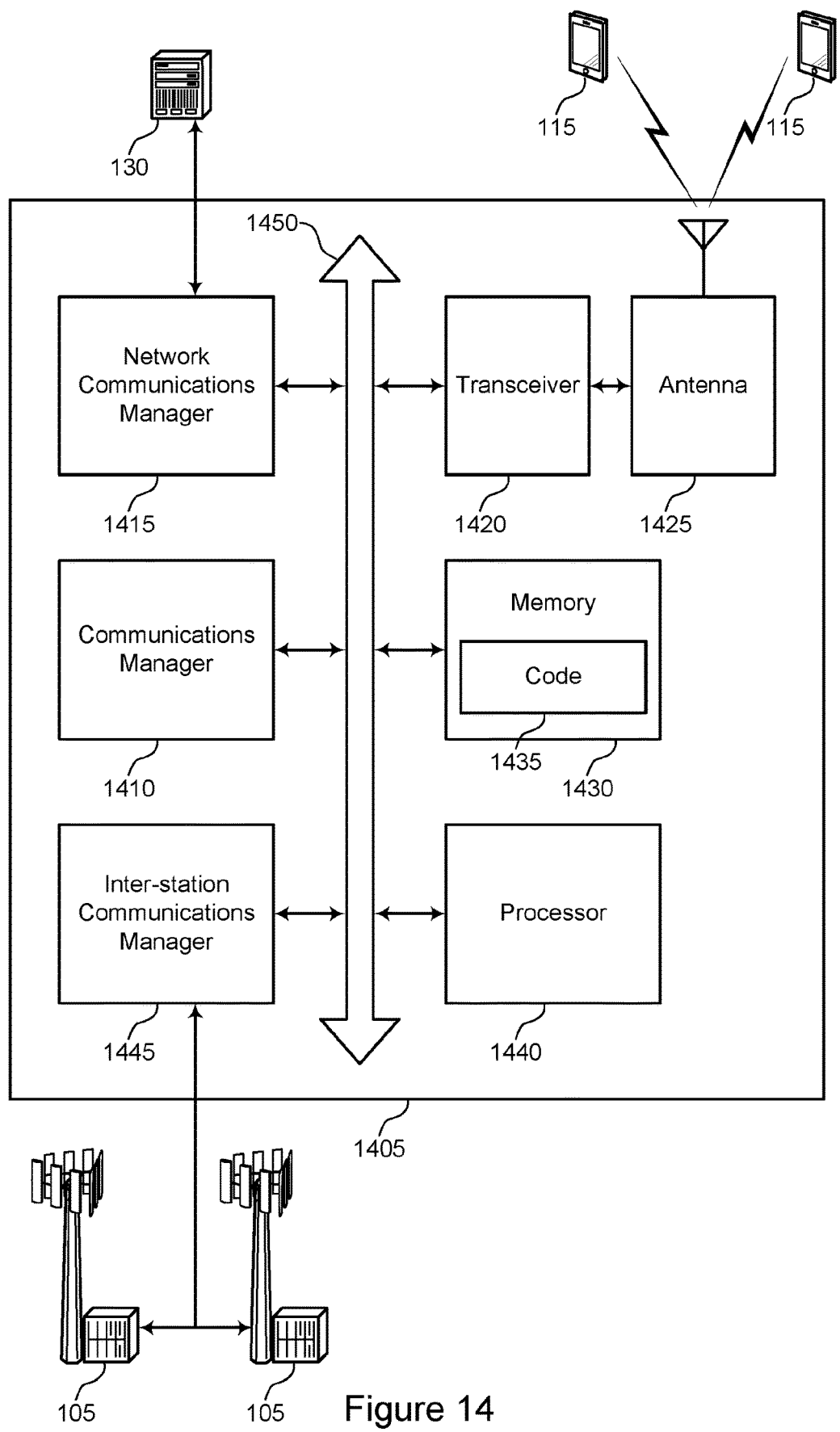
FIG. 14 shows a diagram of a system including a device that supports two-stage DCI for scheduling UEs in accordance with aspects of the present disclosure.

FIG. 14 shows a diagram of a system including a device 1405 that supports two-stage DCI for scheduling UEs in accordance with aspects of the present disclosure. The device 1405 may be an example of or include the components of device 1105, device 1205, a base station 105, or a TRP 205. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (for example, bus 1450).

The communications manager 1410 may determine a first resource for transmitting first DCI to a group of UEs including a UE and a second resource for transmitting second DCI to the UE, transmit, to the group of UEs, the first DCI over the first resource, the first DCI including an indication of the second resource for the second DCI and first control information common to the group of UEs, and transmit, to the UE, the second DCI over the second resource, the second DCI including control information specific to the UE.

The network communications manager 1415 may manage communications with the core network (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some examples, the wireless device may include a single antenna 1425. However, in some examples the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (for example, the processor 1440) cause the device to perform various functions described herein. In some examples, the memory 1430 may contain, among other things, a BIOS which may control basic hardware or software operation such as the interaction with peripheral components or devices.

The processor 1440 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In some examples, a memory controller may be integrated into processor 1440. The processor 1440 may be configured to execute computer-readable instructions stored in a memory (for example, the memory 1430) to cause the device 1405 to perform various functions (for example, functions or tasks supporting two-stage DCI for scheduling UEs).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some examples, the code 1435 may not be directly executable by the processor 1440 but may cause a computer (for example, when compiled and executed) to perform functions described herein.

Figure 15:
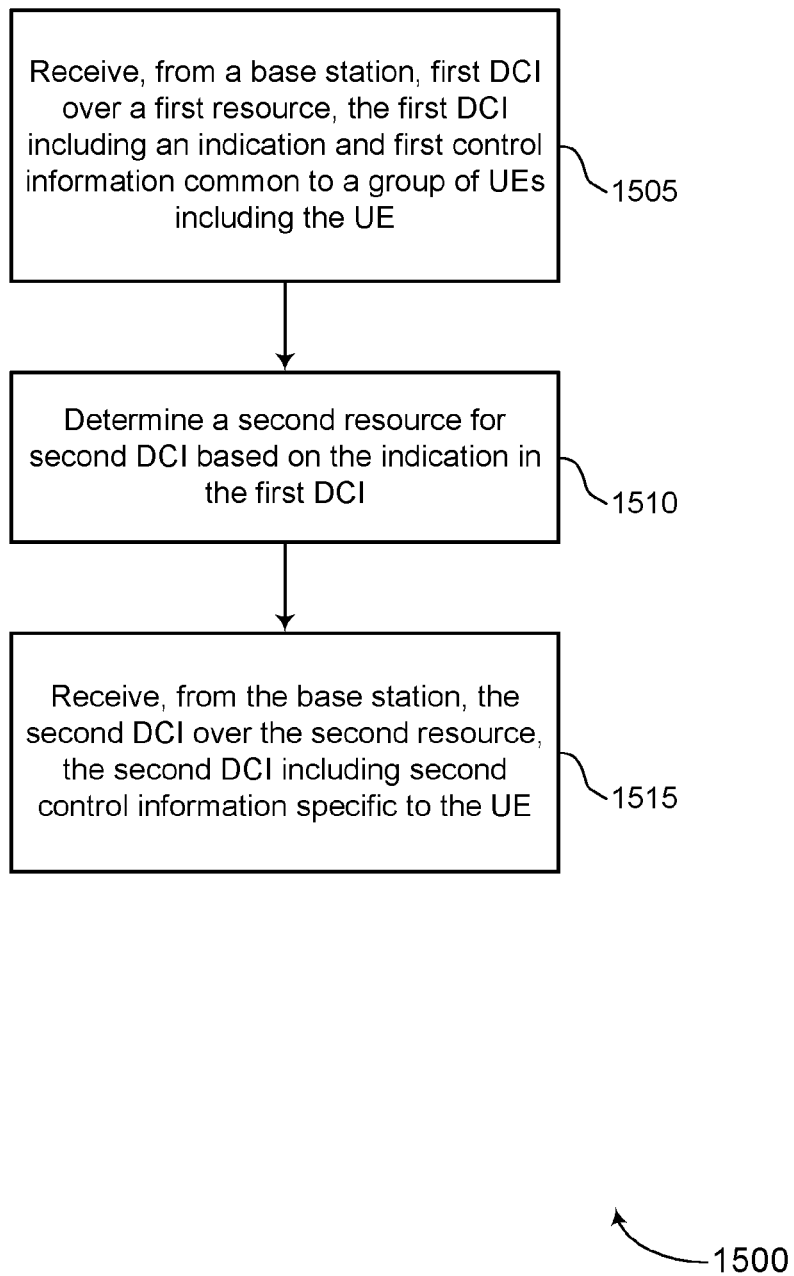
FIGS. 15-22 show flowcharts illustrating methods that support two-stage DCI for scheduling UEs in accordance with aspects of the present disclosure.

FIG. 15 shows a flowchart illustrating a method 1500 that supports two-stage DCI for scheduling UEs in accordance with aspects of the present disclosure. The operations of method 1500 may be implemented by a UE 115 or its components. For example, the operations of method 1500 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, first DCI over a first resource, the first DCI including an indication and first control information common to a group of UEs including the UE. The operations of 1505 may be performed according to the methods described herein. In some examples, aspects of the operations of 1505 may be performed by a DCI component as described with reference to FIGS. 7-10.

At 1510, the UE may determine a second resource for second DCI based on the indication in the first DCI. The operations of 1510 may be performed according to the methods described herein. In some examples, aspects of the operations of 1510 may be performed by a resource component as described with reference to FIGS. 7-10.

At 1515, the UE may receive, from the base station, the second DCI over the second resource, the second DCI including second control information specific to the UE. The operations of 1515 may be performed according to the methods described herein. In some examples, aspects of the operations of 1515 may be performed by a DCI component as described with reference to FIGS. 7-10.

Figure 16:
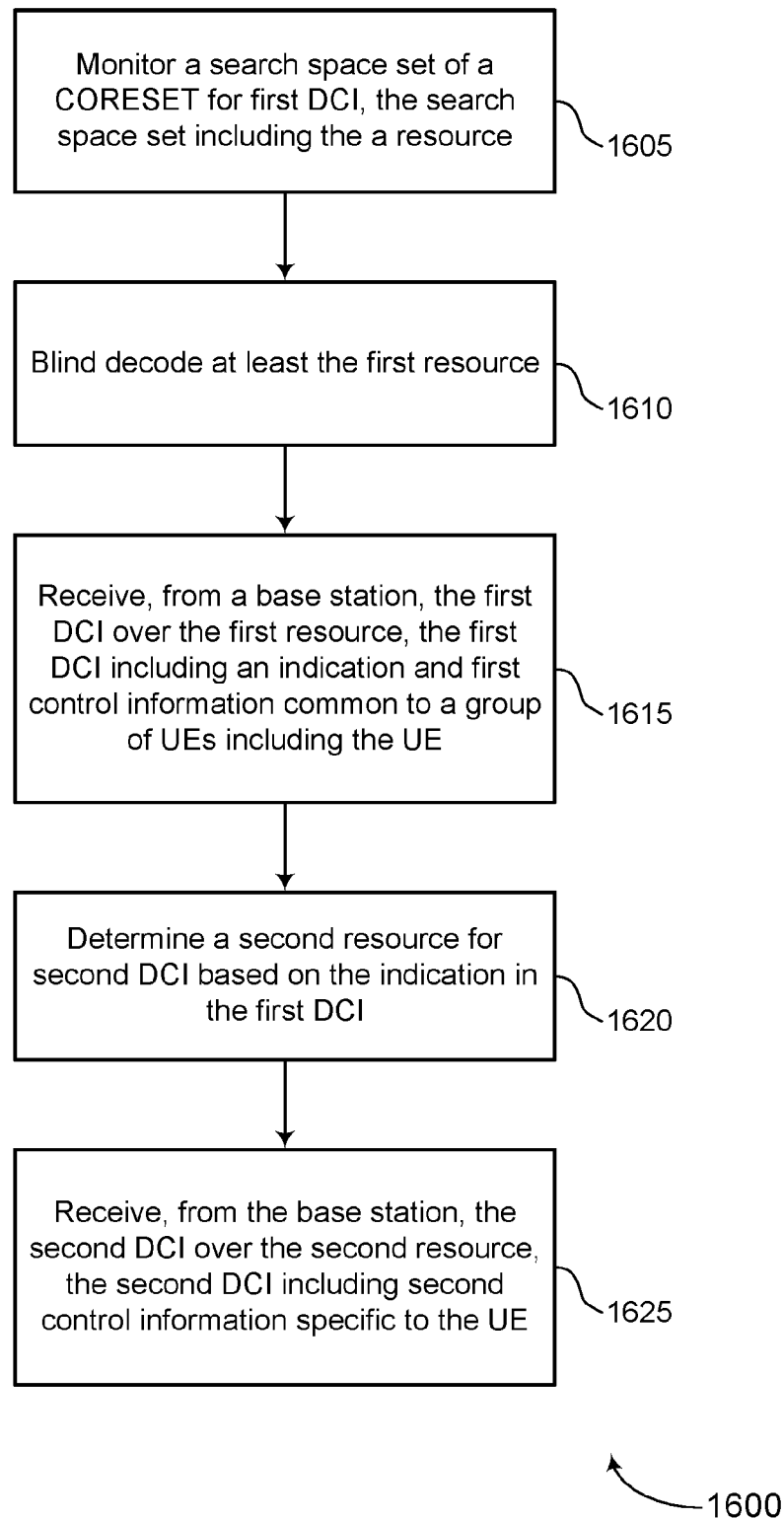

FIG. 16 shows a flowchart illustrating a method 1600 that supports two-stage DCI for scheduling UEs in accordance with aspects of the present disclosure. The operations of method 1600 may be implemented by a UE 115 or its components. For example, the operations of method 1600 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1605, the UE may monitor a search space set of a CORESET for first DCI, the search space set including a first resource. The operations of 1605 may be performed according to the methods described herein. In some examples, aspects of the operations of 1605 may be performed by a monitoring component as described with reference to FIGS. 7-10.

At 1610, the UE may blind decode at least the first resource. The operations of 1610 may be performed according to the methods described herein. In some examples, aspects of the operations of 1610 may be performed by a decoding component as described with reference to FIGS. 7-10.

At 1615, the UE may receive, from a base station, the first DCI over the first resource, the first DCI including an indication and first control information common to a group of UEs including the UE. The operations of 1615 may be performed according to the methods described herein. In some examples, aspects of the operations of 1615 may be performed by a DCI component as described with reference to FIGS. 7-10.

At 1620, the UE may determine a second resource for second DCI based on the indication in the first DCI. The operations of 1620 may be performed according to the methods described herein. In some examples, aspects of the operations of 1620 may be performed by a resource component as described with reference to FIGS. 7-10.

At 1625, the UE may receive, from the base station, the second DCI over the second resource, the second DCI including second control information specific to the UE. The operations of 1625 may be performed according to the methods described herein. In some examples, aspects of the operations of 1625 may be performed by a DCI component as described with reference to FIGS. 7-10.

Figure 17:
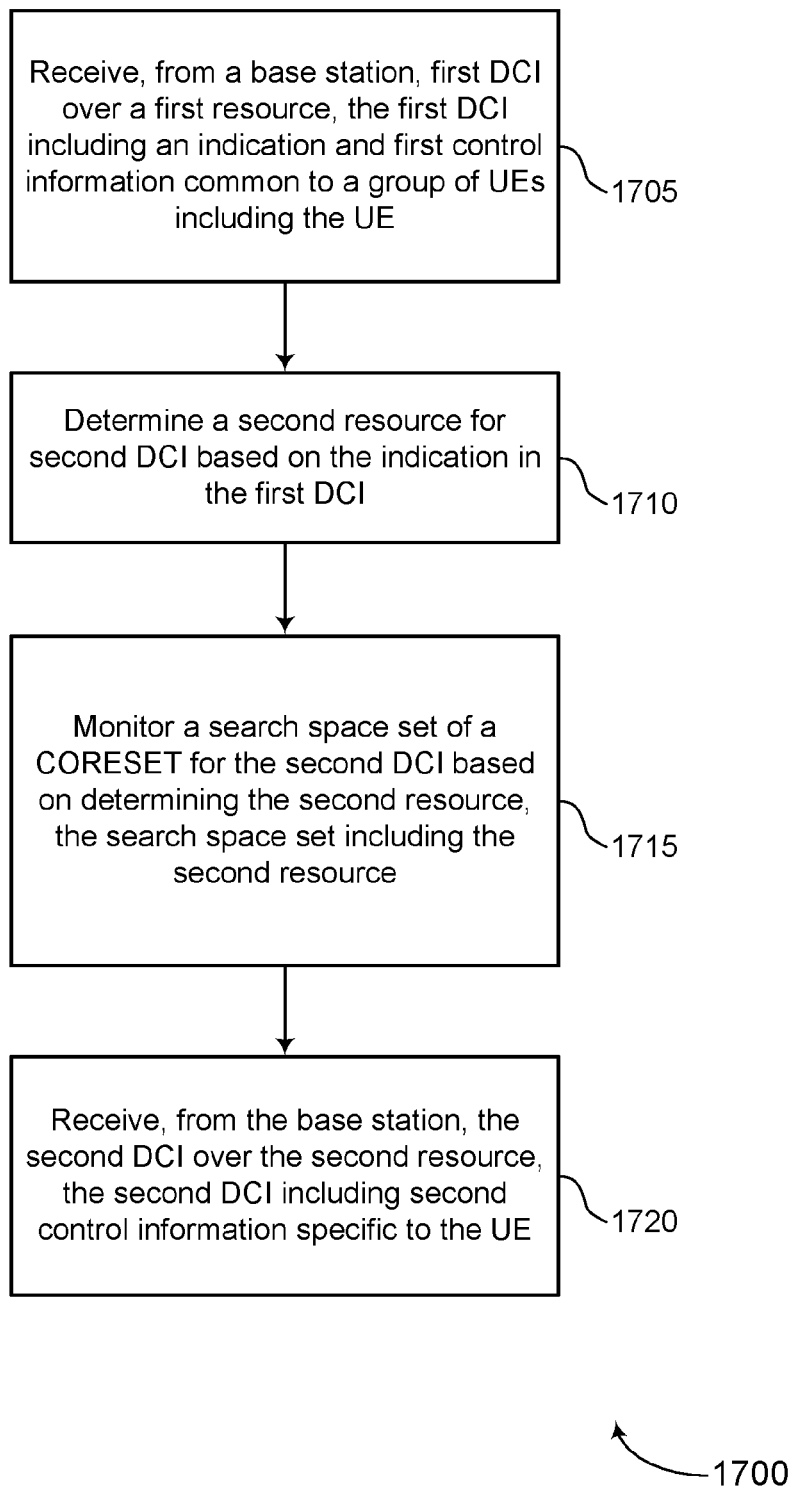

FIG. 17 shows a flowchart illustrating a method 1700 that supports two-stage DCI for scheduling UEs in accordance with aspects of the present disclosure. The operations of method 1700 may be implemented by a UE 115 or its components. For example, the operations of method 1700 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, first DCI over a first resource, the first DCI including an indication and first control information common to a group of UEs including the UE. The operations of 1705 may be performed according to the methods described herein. In some examples, aspects of the operations of 1705 may be performed by a DCI component as described with reference to FIGS. 7-10.

At 1710, the UE may determine a second resource for second DCI based on the indication in the first DCI. The operations of 1710 may be performed according to the methods described herein. In some examples, aspects of the operations of 1710 may be performed by a resource component as described with reference to FIGS. 7-10.

At 1715, the UE may monitor a search space set of a CORESET for the second DCI based on determining the second resource, the search space set including the second resource. The operations of 1715 may be performed according to the methods described herein. In some examples, aspects of the operations of 1715 may be performed by a monitoring component as described with reference to FIGS. 7-10.

At 1720, the UE may receive, from the base station, the second DCI over the second resource, the second DCI including second control information specific to the UE. The operations of 1720 may be performed according to the methods described herein. In some examples, aspects of the operations of 1720 may be performed by a DCI component as described with reference to FIGS. 7-10.

Figure 18:
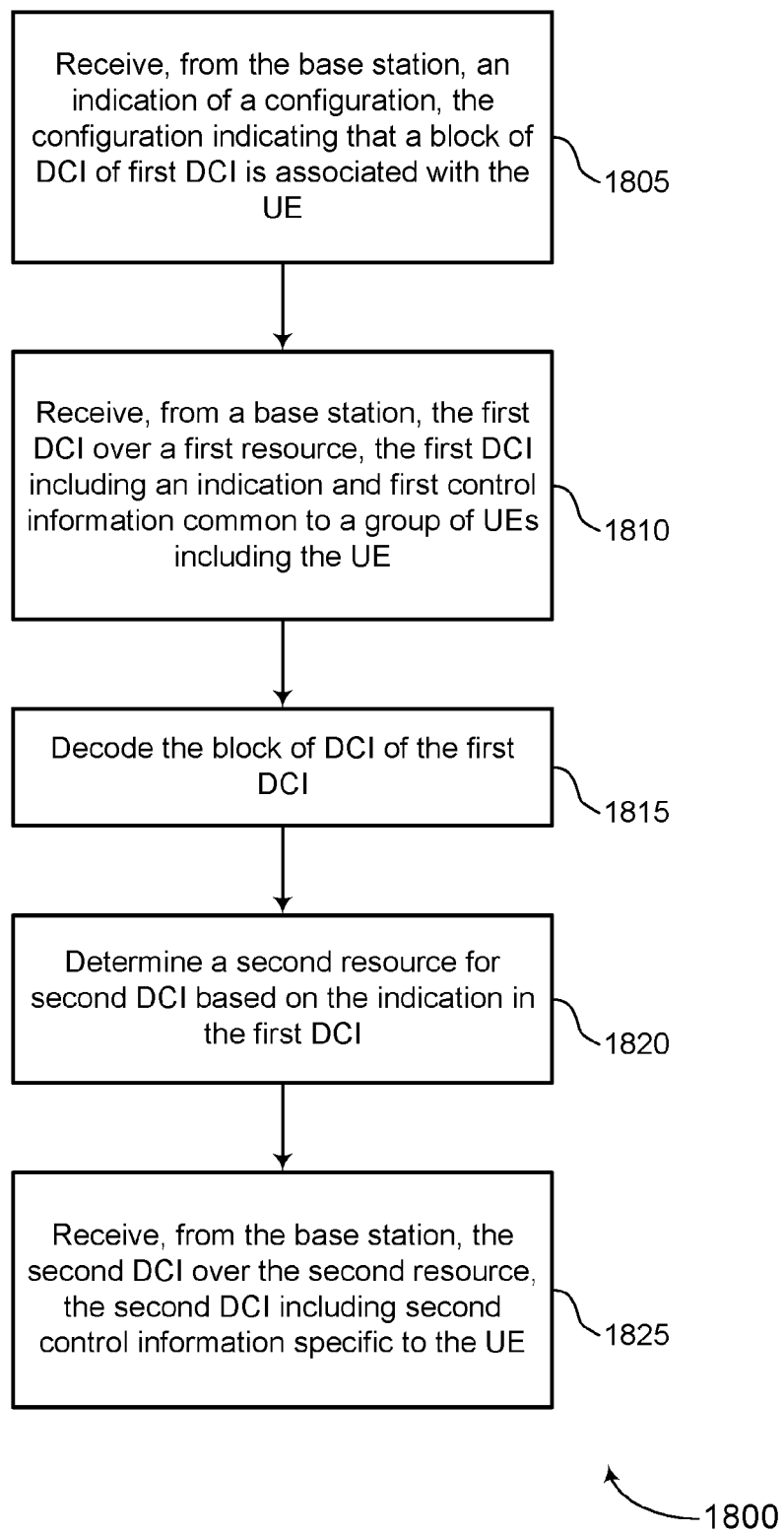

FIG. 18 shows a flowchart illustrating a method 1800 that supports two-stage DCI for scheduling UEs in accordance with aspects of the present disclosure. The operations of method 1800 may be implemented by a UE 115 or its components. For example, the operations of method 1800 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1805, the UE may receive, from the base station, an indication of a configuration, the configuration indicating that a block of DCI of first DCI is associated with the UE. The operations of 1805 may be performed according to the methods described herein. In some examples, aspects of the operations of 1805 may be performed by a DCI block component as described with reference to FIGS. 7-10.

At 1810, the UE may receive, from a base station, the first DCI over a first resource, the first DCI including an indication and first control information common to a group of UEs including the UE. The operations of 1810 may be performed according to the methods described herein. In some examples, aspects of the operations of 1810 may be performed by a DCI component as described with reference to FIGS. 7-10.

At 1815, the UE may decode the block of DCI of the first DCI. The operations of 1815 may be performed according to the methods described herein. In some examples, aspects of the operations of 1815 may be performed by a decoding component as described with reference to FIGS. 7-10.

At 1820, the UE may determine a second resource for second DCI based on the indication in the first DCI. The operations of 1820 may be performed according to the methods described herein. In some examples, aspects of the operations of 1820 may be performed by a resource component as described with reference to FIGS. 7-10.

At 1825, the UE may receive, from the base station, the second DCI over the second resource, the second DCI including second control information specific to the UE. The operations of 1825 may be performed according to the methods described herein. In some examples, aspects of the operations of 1825 may be performed by a DCI component as described with reference to FIGS. 7-10.

Figure 19:
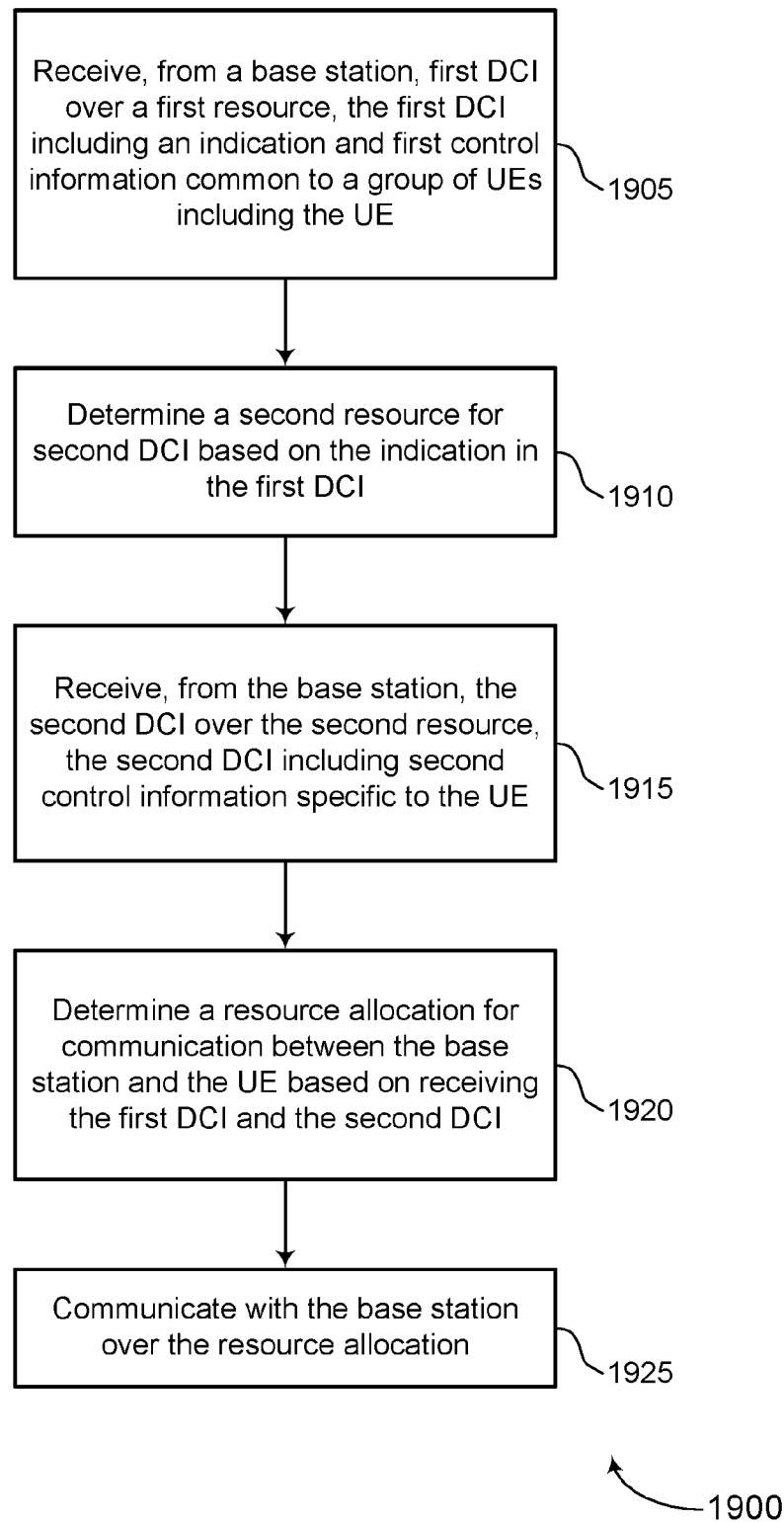

FIG. 19 shows a flowchart illustrating a method 1900 that supports two-stage DCI for scheduling UEs in accordance with aspects of the present disclosure. The operations of method 1900 may be implemented by a UE 115 or its components. For example, the operations of method 1900 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, first DCI over a first resource, the first DCI including an indication and first control information common to a group of UEs including the UE. The operations of 1905 may be performed according to the methods described herein. In some examples, aspects of the operations of 1905 may be performed by a DCI component as described with reference to FIGS. 7-10.

At 1910, the UE may determine a second resource for second DCI based on the indication in the first DCI. The operations of 1910 may be performed according to the methods described herein. In some examples, aspects of the operations of 1910 may be performed by a resource component as described with reference to FIGS. 7-10.

At 1915, the UE may receive, from the base station, the second DCI over the second resource, the second DCI including second control information specific to the UE. The operations of 1915 may be performed according to the methods described herein. In some examples, aspects of the operations of 1915 may be performed by a DCI component as described with reference to FIGS. 7-10.

At 1920, the UE may determine a resource allocation for communication between the base station and the UE based on receiving the first DCI and the second DCI. The operations of 1920 may be performed according to the methods described herein. In some examples, aspects of the operations of 1920 may be performed by a communication component as described with reference to FIGS. 7-10.

At 1925, the UE may communicate with the base station over the resource allocation. The operations of 1925 may be performed according to the methods described herein. In some examples, aspects of the operations of 1925 may be performed by a communication component as described with reference to FIGS. 7-10.

Figure 20:
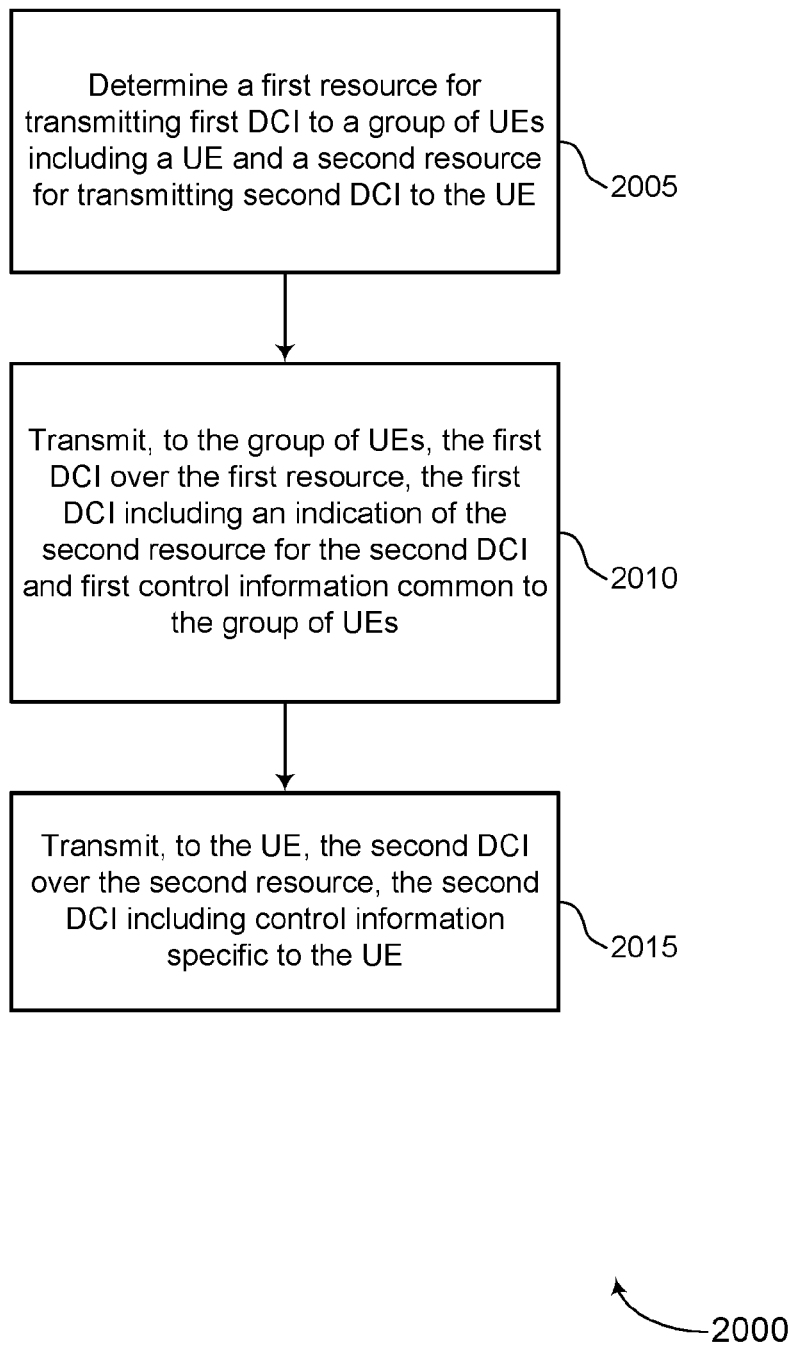

FIG. 20 shows a flowchart illustrating a method 2000 that supports two-stage DCI for scheduling UEs in accordance with aspects of the present disclosure. The operations of method 2000 may be implemented by a base station 105 or its components. For example, the operations of method 2000 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 2005, the base station may determine a first resource for transmitting first DCI to a group of UEs including a UE and a second resource for transmitting second DCI to the UE. The operations of 2005 may be performed according to the methods described herein. In some examples, aspects of the operations of 2005 may be performed by a resource component as described with reference to FIGS. 11-14.

At 2010, the base station may transmit, to the group of UEs, the first DCI over the first resource, the first DCI including an indication of the second resource for the second DCI and first control information common to the group of UEs. The operations of 2010 may be performed according to the methods described herein. In some examples, aspects of the operations of 2010 may be performed by a DCI component as described with reference to FIGS. 11-14.

At 2015, the base station may transmit, to the UE, the second DCI over the second resource, the second DCI including control information specific to the UE. The operations of 2015 may be performed according to the methods described herein. In some examples, aspects of the operations of 2015 may be performed by a DCI component as described with reference to FIGS. 11-14.

Figure 21:
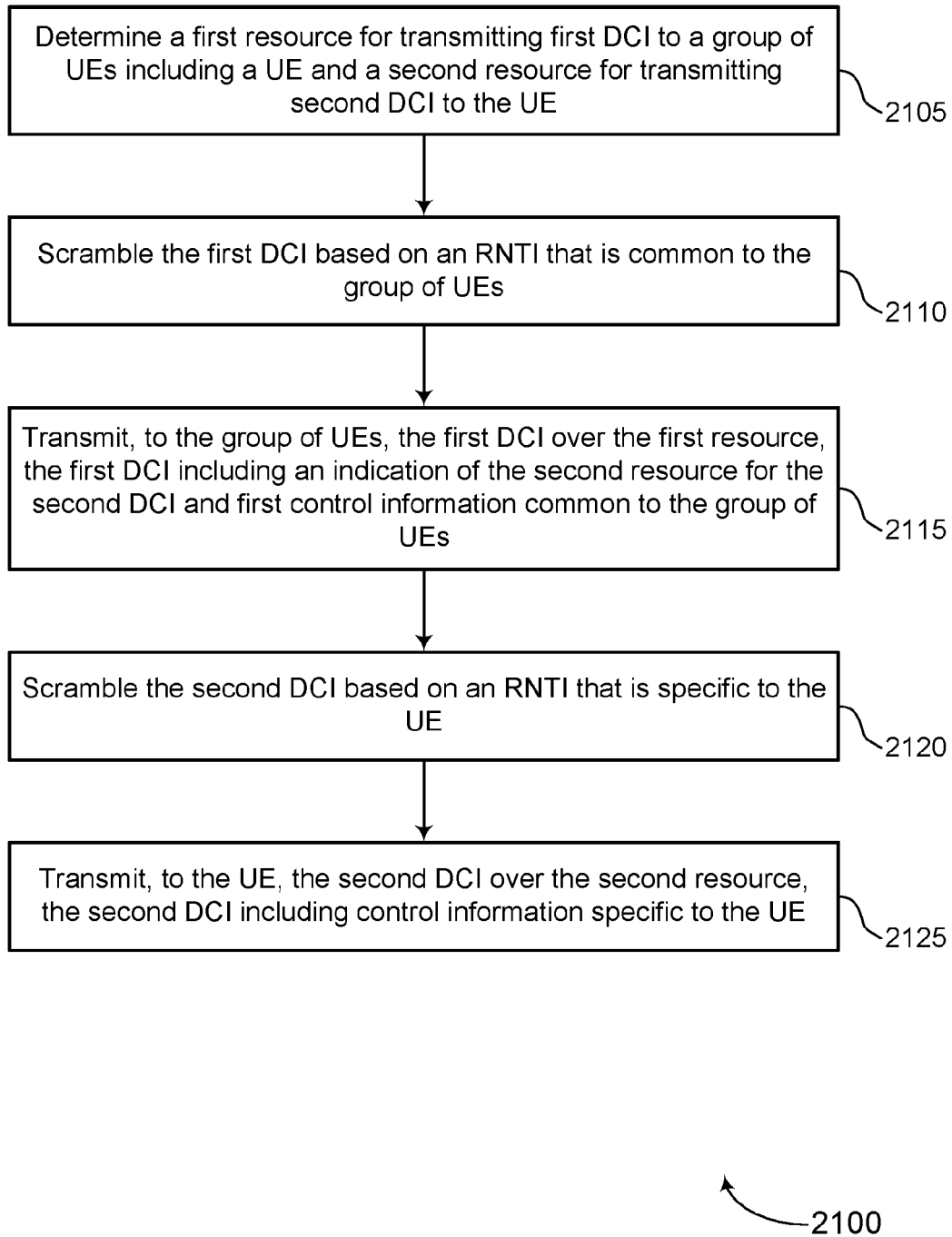

FIG. 21 shows a flowchart illustrating a method 2100 that supports two-stage DCI for scheduling UEs in accordance with aspects of the present disclosure. The operations of method 2100 may be implemented by a base station 105 or its components. For example, the operations of method 2100 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 2105, the base station may determine a first resource for transmitting first DCI to a group of UEs including a UE and a second resource for transmitting second DCI to the UE. The operations of 2105 may be performed according to the methods described herein. In some examples, aspects of the operations of 2105 may be performed by a resource component as described with reference to FIGS. 11-14.

At 2110, the base station may scramble the first DCI based on an RNTI that is common to the group of UEs. The operations of 2110 may be performed according to the methods described herein. In some examples, aspects of the operations of 2110 may be performed by a scrambling component as described with reference to FIGS. 11-14.

At 2115, the base station may transmit, to the group of UEs, the first DCI over the first resource, the first DCI including an indication of the second resource for the second DCI and first control information common to the group of UEs. The operations of 2115 may be performed according to the methods described herein. In some examples, aspects of the operations of 2115 may be performed by a DCI component as described with reference to FIGS. 11-14.

At 2120, the base station may scramble the second DCI based on an RNTI that is specific to the UE. The operations of 2120 may be performed according to the methods described herein. In some examples, aspects of the operations of 2120 may be performed by a scrambling component as described with reference to FIGS. 11-14.

At 2125, the base station may transmit, to the UE, the second DCI over the second resource, the second DCI including control information specific to the UE. The operations of 2125 may be performed according to the methods described herein. In some examples, aspects of the operations of 2125 may be performed by a DCI component as described with reference to FIGS. 11-14.

Figure 22:
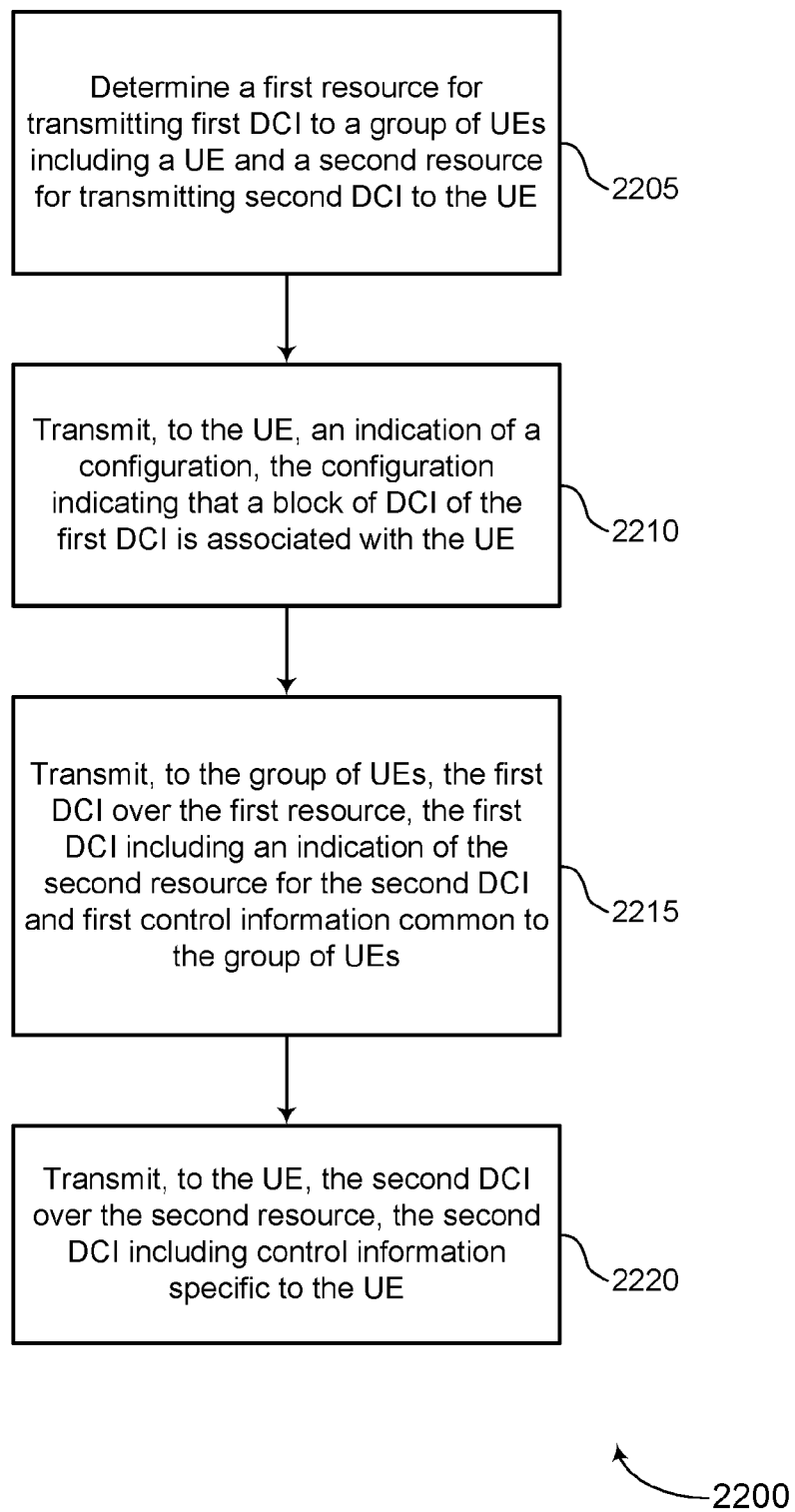

FIG. 22 shows a flowchart illustrating a method 2200 that supports two-stage DCI for scheduling UEs in accordance with aspects of the present disclosure. The operations of method 2200 may be implemented by a base station 105 or its components. For example, the operations of method 2200 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 2205, the base station may determine a first resource for transmitting first DCI to a group of UEs including a UE and a second resource for transmitting second DCI to the UE. The operations of 2205 may be performed according to the methods described herein. In some examples, aspects of the operations of 2205 may be performed by a resource component as described with reference to FIGS. 11-14.

At 2210, the base station may transmit, to the UE, an indication of a configuration, the configuration indicating that a block of DCI of the first DCI is associated with the UE. The operations of 2210 may be performed according to the methods described herein. In some examples, aspects of the operations of 2210 may be performed by a DCI block component as described with reference to FIGS. 11-14.

At 2215, the base station may transmit, to the group of UEs, the first DCI over the first resource, the first DCI including an indication of the second resource for the second DCI and first control information common to the group of UEs. The operations of 2215 may be performed according to the methods described herein. In some examples, aspects of the operations of 2215 may be performed by a DCI component as described with reference to FIGS. 11-14.

At 2220, the base station may transmit, to the UE, the second DCI over the second resource, the second DCI including control information specific to the UE. The operations of 2220 may be performed according to the methods described herein. In some examples, aspects of the operations of 2220 may be performed by a DCI component as described with reference to FIGS. 11-14.

It is noted that the methods described herein describe possible implementations, and that the operations and the features may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and features disclosed herein.

What is claimed is:

1. A method for wireless communications at a user equipment (UE), comprising:
   receiving an indication of a configuration via radio resource control (RRC) signaling, the configuration indicating that a block of downlink control information is associated with the UE;
   receiving first downlink control information via a first resource, the first downlink control information comprising:
      first control information common to a group of UEs including the UE, and
      the block of downlink control information that comprises an indication of a second resource from a resource pool for the group of UEs, the second resource supporting reception of second downlink control information for the UE; and
   receiving the second downlink control information via the second resource, the second downlink control information comprising second control information specific to the UE.

2. The method of claim 1, further comprising:
   monitoring a search space set of a control resource set for the first downlink control information, the search space set comprising the first resource; and
   blind decoding at least the first resource, wherein receiving the first downlink control information is based at least in part on the blind decoding.

3. The method of claim 1, further comprising monitoring a search space set of a control resource set for the second downlink control information based at least in part on the indication of the second resource, the search space set comprising the second resource, wherein receiving the second downlink control information is based at least in part on the monitoring.

4. The method of claim 1, wherein receiving the second downlink control information via the second resource comprises receiving the second downlink control information via a physical downlink shared channel based at least in part on the indication of the second resource, the physical downlink shared channel comprising the second resource.

5. The method of claim 1, wherein the first downlink control information is scrambled based at least in part on a radio network temporary identifier that is common to the group of UEs, and wherein receiving the first downlink control information comprises:
   decoding the scrambled first downlink control information based at least in part on the radio network temporary identifier that is common to the group of UEs.

6. The method of claim 1, wherein the second downlink control information is scrambled based at least in part on a radio network temporary identifier that is specific to the UE, and wherein receiving the second downlink control information comprises:
   decoding the scrambled second downlink control information based at least in part on the radio network temporary identifier that is specific to the UE.

7. The method of claim 1, further comprising:
   decoding the block of downlink control information of the first downlink control information in accordance with the configuration.

8. The method of claim 1, wherein the block of downlink control information further comprises a second indication of an existence of the second downlink control information.

9. The method of claim 1, further comprising:
   determining a resource allocation for communication between a network device and the UE based at least in part on the first downlink control information and the second downlink control information; and
   communicating with the network device via the resource allocation.

10. The method of claim 1, wherein the UE operates in cooperation with the group of UEs and the group of UEs comprises a set of distributed panels, the method further comprising:
    communicating with a network device as a distributed panel of the set of distributed panels.

11. The method of claim 1, further comprising:
    determining the resource pool based at least in part on the indication of the second resource; and
    determining a value of a resource selector associated with the UE, the resource selector included in the first downlink control information, wherein determining the second resource from the resource pool is based at least in part on the value of the resource selector.

12. The method of claim 1, further comprising:
    determining the resource pool based at least in part on a resource pool configuration; and determining a value of a resource selector associated with the UE, wherein the indication of the second resource comprises the resource selector, and wherein determining the second resource from the resource pool is based at least in part on the value of the resource selector.

13. The method of claim 12, wherein the resource pool configuration is pre-configured at the UE.

14. A method for wireless communication at a network device, comprising:
transmitting an indication of a configuration via radio resource control (RRC) signaling, the configuration indicating that a block of downlink control information is associated with a user equipment (UE);
transmitting, for a group of UEs including the UE, first downlink control information via a first resource, the first downlink control information comprising:
first control information common to the group of UEs, and
the block of downlink control information that comprises an indication of a second resource from a resource pool for the group of UEs, the second resource supporting transmission of second downlink control information for the UE; and
transmitting, for the UE, the second downlink control information via the second resource, the second downlink control information comprising control information specific to the UE.

15. The method of claim 14, further comprising:
determining a resource allocation for communication between the network device and the UE, wherein transmitting the second downlink control information is based at least in part on determining the resource allocation for communication between the network device and the UE; and
communicating with the UE via the resource allocation.

16. The method of claim 14, wherein the group of UEs comprises a set of distributed panels, the method further comprising:
communicating with the group of UEs as a transmission and reception point in a network of distributed panels.

17. The method of claim 14, wherein transmitting the first downlink control information via the first resource comprises transmitting the first downlink control information via a search space set of a control resource set, wherein the search space set comprises the first resource.

18. The method of claim 14, wherein transmitting the second downlink control information via the second resource comprises transmitting the second downlink control information via a search space set of a control resource set based at least in part on the indication of the second resource, wherein the search space set comprises the second resource.

19. The method of claim 14, wherein transmitting the second downlink control information via the second resource comprises transmitting the second downlink control information via a physical downlink shared channel based at least in part on the indication of the second resource, wherein the physical downlink shared channel comprises the second resource.

20. The method of claim 14, wherein the first downlink control information further comprises a second block of downlink control information that comprises a second indication of a third resource from the resource pool for the group of UEs, the third resource supporting transmission of third downlink control information for a second UE of the group of UEs, the method further comprising:

transmitting, for the second UE, the third downlink control information via the third resource, the third downlink control information comprising second control information specific to the second UE.

21. The method of claim 14, further comprising scrambling the first downlink control information based at least in part on a radio network temporary identifier that is common to the group of UEs.

22. The method of claim 14, further comprising scrambling the second downlink control information based at least in part on a radio network temporary identifier that is specific to the UE.

23. The method of claim 14, wherein the block of downlink control information further comprises a second indication of an existence of the second downlink control information.

24. The method of claim 14, further comprising determining the resource pool for the group of UEs.

25. The method of claim 24, wherein the indication of the second resource is indicative of the resource pool, and wherein transmitting the first downlink control information comprises:
transmitting, for the UE, a resource selector indicating the second resource from the resource pool in the block of downlink control information associated with the UE.

26. The method of claim 24, wherein the resource pool is pre-configured at the UE based at least in part on a resource pool configuration, and wherein the indication of the second resource comprises a resource selector that indicates the second resource from the resource pool.

27. A user equipment (UE), comprising:
at least one processor,
at least one memory coupled with the at least one processor, the at least one memory storing instructions executable by the at least one processor to cause the UE to:
receive an indication of a configuration via radio resource control (RRC) signaling, the configuration indicating that a block of downlink control information is associated with the UE;
receive first downlink control information via a first resource, the first downlink control information comprising:
first control information common to a group of UEs including the UE, and
the block of downlink control information that comprises an indication of a second resource from a resource pool for the group of UEs, the second resource supporting reception of second downlink control information for the UE; and
receive the second downlink control information via the second resource, the second downlink control information comprising second control information specific to the UE.

28. The UE of claim 27, wherein the instructions are further executable by the at least one processor to cause the UE to:
monitor a search space set of a control resource set for the first downlink control information, the search space set comprising the first resource; and
blind decode at least the first resource, wherein receiving the first downlink control information is based at least in part on the blind decoding.

29. The UE of claim 27, wherein the instructions are further executable by the at least one processor to cause the UE to decode the block of downlink control information of the first downlink control information in accordance with the configuration.

30. The UE of claim 27, wherein the instructions are further executable by the at least one processor to cause the UE to:
  determine a resource allocation for communication between a network device and the UE based at least in part on the first downlink control information and the second downlink control information; and
  communicate with the network device via the resource allocation.

31. A network device, comprising:
  at least one processor,
  at least one memory coupled with the at least one processor, the at least one memory storing instructions executable by the at least one processor to cause the network device to:
    transmit an indication of a configuration via radio resource control (RRC) signaling, the configuration indicating that a block of downlink control information is associated with a user equipment (UE);
    transmit, for a group of UEs including the UE, first downlink control information via a first resource, the first downlink control information comprising:
      first control information common to the group of UEs, and
      the block of downlink control information that comprises an indication of a second resource from a resource pool for the group of UEs, the second resource supporting transmission of second downlink control information for the UE; and
    transmit, for the UE, the second downlink control information via the second resource, the second downlink control information comprising control information specific to the UE.

32. The network device of claim 31, wherein the instructions to transmit the first downlink control information via the first resource are executable by the at least one processor to cause the network device to transmit the first downlink control information via a search space set of a control resource set, wherein the search space set comprises the first resource.

33. The network device of claim 31, wherein the instructions are further executable by the at least one processor to cause the network device to scramble the first downlink control information based at least in part on a radio network temporary identifier that is common to the group of UEs.

34. The network device of claim 31, wherein the instructions are further executable by the at least one processor to cause the network device to scramble the second downlink control information based at least in part on a radio network temporary identifier that is specific to the UE.

35. An apparatus for wireless communications at a user equipment (UE), comprising:
  means for receiving an indication of a configuration via radio resource control (RRC) signaling, the configuration indicating that a block of downlink control information is associated with the UE;
  means for receiving first downlink control information via a first resource, the first downlink control information comprising:
    first control information common to a group of UEs including the UE, and
    the block of downlink control information that comprises an indication of a second resource from a resource pool for the group of UEs, the second resource supporting reception of second downlink control information for the UE; and
  means for receiving the second downlink control information via the second resource, the second downlink control information comprising second control information specific to the UE.

* * * * *